(12) United States Patent
Watanabe et al.

(10) Patent No.: US 12,159,629 B2
(45) Date of Patent: Dec. 3, 2024

(54) INFORMATION PROCESSING APPARATUS, METHOD AND COMPUTER READABLE MEDIUM

(71) Applicant: KABUSHIKI KAISHA TOSHIBA, Tokyo (JP)

(72) Inventors: Nayuko Watanabe, Kawasaki (JP); Toshiaki Nakasu, Chofu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 366 days.

(21) Appl. No.: 17/652,554

(22) Filed: Feb. 25, 2022

(65) Prior Publication Data
US 2023/0014452 A1    Jan. 19, 2023

(30) Foreign Application Priority Data
Jul. 16, 2021 (JP) .................................. 2021-117888

(51) Int. Cl.
| G10L 15/19 | (2013.01) |
| G06F 40/186 | (2020.01) |
| G10L 15/22 | (2006.01) |
| G10L 15/08 | (2006.01) |

(52) U.S. Cl.
CPC ............ G10L 15/19 (2013.01); G06F 40/186 (2020.01); G10L 15/22 (2013.01); *G10L 2015/088* (2013.01)

(58) Field of Classification Search
None
See application file for complete search history.

(56) References Cited

U.S. PATENT DOCUMENTS

| 9,177,551 B2* | 11/2015 | Wilpon | ................. | G10L 15/26 |
| 9,275,643 B2* | 3/2016 | Koll | .................. | G06F 3/167 |
| 2002/0032564 A1* | 3/2002 | Ehsani | .................. | G06F 40/40 |
| | | | | 704/E15.04 |
| 2003/0154085 A1* | 8/2003 | Kelley | .................. | G06F 40/174 |
| | | | | 704/E15.045 |
| 2006/0167686 A1* | 7/2006 | Kahn | .................... | G06F 40/174 |
| | | | | 704/E15.044 |
| 2007/0055492 A1* | 3/2007 | Wang | ................... | G06F 40/186 |
| | | | | 704/9 |
| 2010/0278453 A1* | 11/2010 | King | ..................... | G06F 40/197 |
| | | | | 715/230 |

(Continued)

FOREIGN PATENT DOCUMENTS

| EP | 2 090 977 A1 | 8/2009 |
| JP | 2008-52676 A | 3/2008 |
| JP | 2021-89576 A | 6/2021 |

*Primary Examiner* — Neeraj Sharma
(74) *Attorney, Agent, or Firm* — Oblon, McClelland, Maier & Neustadt, L.L.P.

(57) ABSTRACT

According to one embodiment, an information processing apparatus includes a processor. The processor generates a template, regarding a recording data sheet including a plurality of items, for one or more of the items that can be specified, with reference to an input order of input target items selected from the items. The processor performs a speech recognition on an utterance of a user and generate a speech recognition result. The processor determines an input target range relating to one more items specified by the utterance of the user among the items based on the template and the speech recognition result.

15 Claims, 24 Drawing Sheets

(56) References Cited

U.S. PATENT DOCUMENTS

| | | | |
|---|---|---|---|
| 2012/0063684 A1* | 3/2012 | Denoue | G06V 30/412 |
| | | | 382/175 |
| 2014/0258827 A1* | 9/2014 | Gormish | G06F 40/174 |
| | | | 715/224 |
| 2016/0225369 A1* | 8/2016 | Agrawal | G10L 25/48 |
| 2016/0255139 A1* | 9/2016 | Rathod | H04N 1/32101 |
| | | | 709/203 |
| 2018/0025287 A1* | 1/2018 | Mathew | G06N 3/08 |
| | | | 706/12 |
| 2019/0250882 A1* | 8/2019 | Swansey | G06F 3/167 |
| 2020/0395111 A1* | 12/2020 | Forzoni | G10L 15/1815 |
| 2021/0174799 A1 | 6/2021 | Watanabe et al. | |
| 2021/0343292 A1* | 11/2021 | Cox | G06F 3/167 |
| 2022/0318494 A1* | 10/2022 | Park | G06F 40/186 |

\* cited by examiner

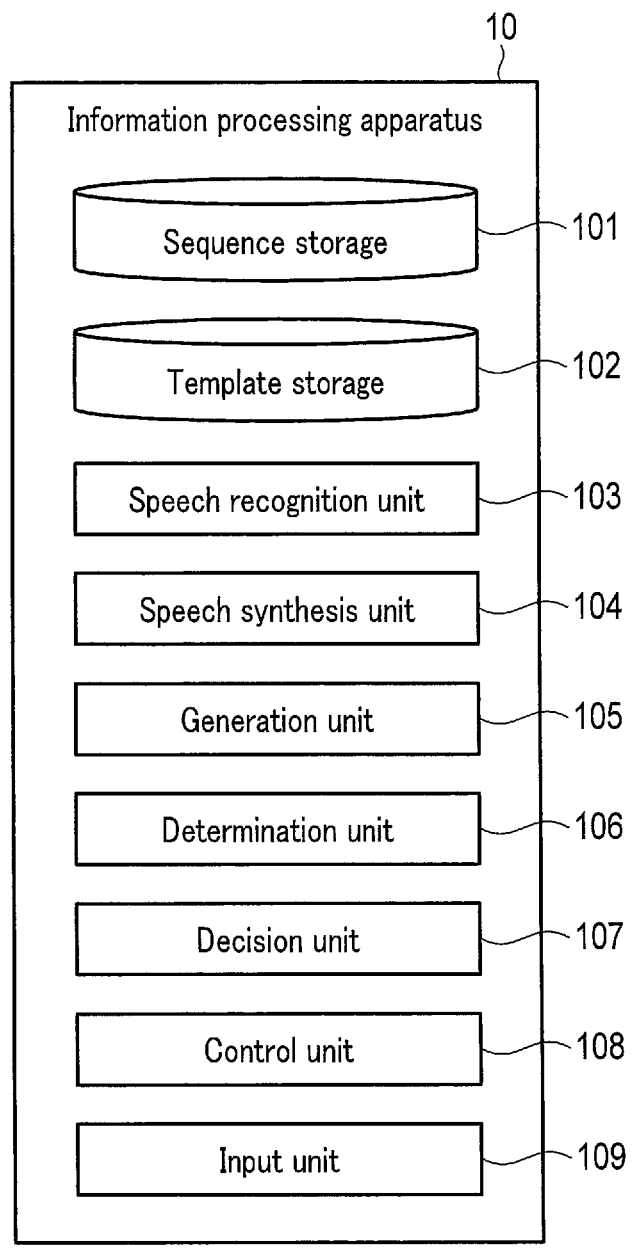
F I G. 1

|   | A | B | C | D |
|---|---|---|---|---|
| 1 |   |   |   | Inspection date |
| 2 | Test number | Test item | | 2021/02/15 |
| 3 | 1 | Appearance check | Is there dirt? | No anomaly |
| 4 | 2 | | Is there flaw? | |
| 5 | 3 | | Is print light? | |
| 6 | 4 | Operating check | Lighting state satisfactory? | |
| 7 | 5 | | Operation state satisfactory? | |
| ⋮ | ⋮ | ⋮ | ⋮ | ⋮ |

FIG. 2

| Sequence number | Input position | Guidance | Input flag |
|---|---|---|---|
| 1 | D2 | Inspection date | 1 |
| 2 | D3 | Dirt | 1 |
| 3 | D4 | Flaw | 0 |
| 4 | D5 | Print | 0 |
| 5 | D6 | Lighting state | 0 |
| 6 | D7 | Operation state | 0 |
| ⋮ | ⋮ | ⋮ | ⋮ |

FIG. 3

| ID | Utterance template |
|---|---|
| 1 | in ${number of sequences} sequences collectively |
| 2 | to ${ending point} collectively |
| 3 | from ${starting point} to ${ending point} collectively |
| ⋮ | ⋮ |

F I G. 4

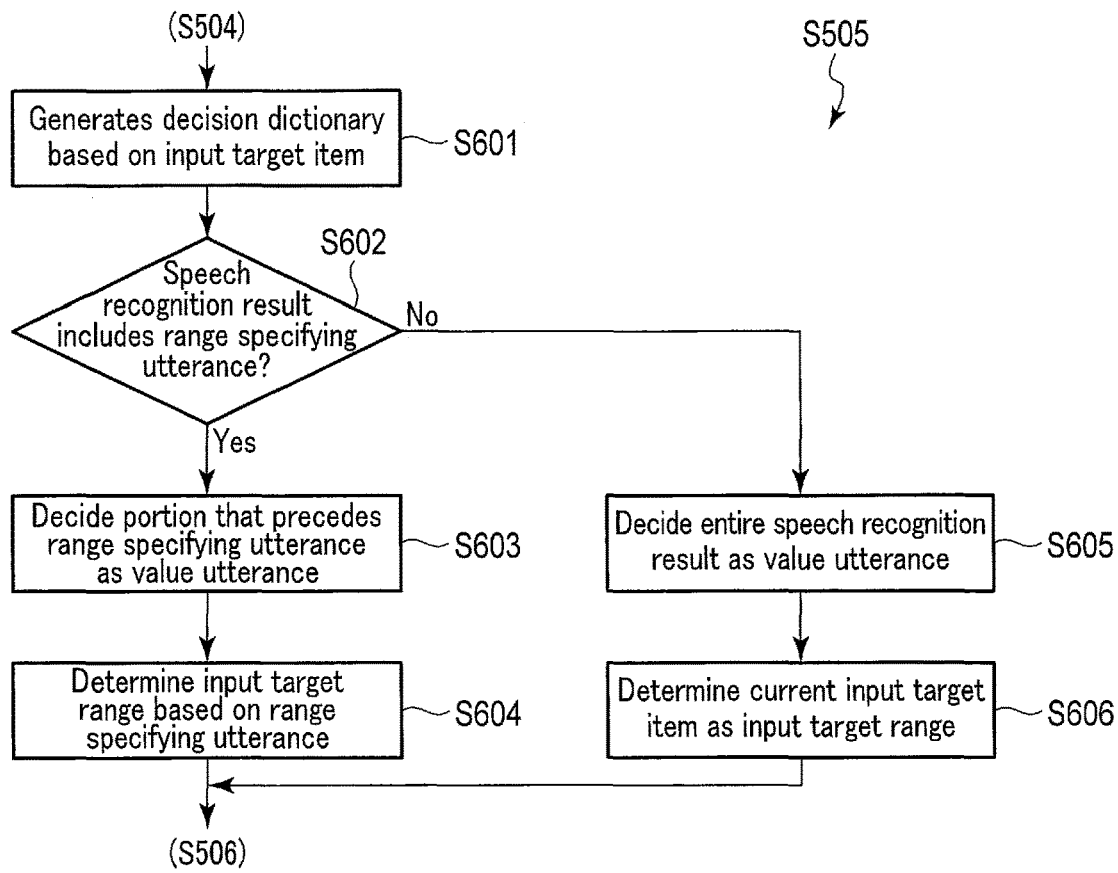

FIG. 6

| ID | Regular expression |
|---|---|
| 1 | in (?<number of sequences>¥d+) sequences collectively |
| 2 | to (?<ending point> (D4)\|(D5)\|(D6)\|(D7)\| ··· \|(flaw)\|(print)\|(lighting state)\|(operation state)\|···) collectively |
| 3 | from (?<starting point> (D2)\|(D3)\|(D4)\|(D5)\|(D6)\|(D7)\| ··· (inspection date)\|(dirt)\|(flaw)\|(print)\|(lighting state)\|(operation state)\|···) to (?<ending point> (D3)\|(D4)\|(D5)\|(D6)\|(D7)\| ··· (dirt)\|(flaw)\|(print)\|(lighting state)\|(operation state)\|···) collectively |
| ⋮ | ⋮ |

FIG. 7

|   | A | B | C | D |
|---|---|---|---|---|
| 1 |   |   |   | Inspection date |
| 2 | Test number | Test item | | 2021/02/15 |
| 3 | 1 | Appearance check | Is there dirt? | |
| 4 | 2 | | Is there flaw? | |
| 5 | 3 | | Is print light? | |
| 6 | 4 | Operating check | Lighting state satisfactory? | |
| 7 | 5 | | Operation state satisfactory? | |
|   | ⋮ | ⋮ | ⋮ | |

|   | A | B | C | D |
|---|---|---|---|---|
| 1 |   |   |   | Inspection date |
| 2 | Test number | Test item | | 2021/02/15 |
| 3 | 1 | Appearance check | Is there dirt? | No anomaly |
| 4 | 2 | | Is there flaw? | No anomaly |
| 5 | 3 | | Is print light? | No anomaly |
| 6 | 4 | Operating check | Lighting state satisfactory? | |
| 7 | 5 | | Operation state satisfactory? | |
|   | ⋮ | ⋮ | ⋮ | |

|   | A | B | C | D |
|---|---|---|---|---|
| 1 |   |   |   | Inspection date |
| 2 | Test number | Test item |   | 2021/02/15 |
| 3 | 1 | Appearance check | Is there dirt? | ▓▓▓ |
| 4 | 2 | | Is there flaw? | ▓▓▓ |
| 5 | 3 | | Is print light? | ▓▓▓ |
| 6 | 4 | Operating check | Lighting state satisfactory? | |
| 7 | 5 | | Operation state satisfactory? | |
| ⋮ | ⋮ | ⋮ | ⋮ | |

1201

F I G. 12

| Sequence number | Input position | Guidance | Group | Input flag |
|---|---|---|---|---|
| 1 | D2 | Inspection date |  | 0 |
| 2 | D3 | Dirt | Appearance | 0 |
| 3 | D4 | Flaw | Appearance | 0 |
| 4 | D5 | Print | Appearance | 0 |
| 5 | D6 | Lighting state | Operating | 0 |
| 6 | D7 | Operation state | Operating | 0 |
| ⋮ | ⋮ | ⋮ | ⋮ | ⋮ |

131

F I G. 13

| ID | Utterance template |
|---|---|
| 1 | in ${number of sequences} sequences collectively |
| 2 | to ${ending point} collectively |
| 3 | from ${starting point} to ${ending point} collectively |
| 4 | ${group} collectively |
| ⋮ | ⋮ |

~141 (row 4)

F I G. 14

| | A | B | C | D |
|---|---|---|---|---|
| 1 | | | | Inspection date |
| 2 | Test number | | Test item | 2021/02/15 |
| 3 | 1 | Appearance check | Is there dirt? | |
| 4 | 2 | | Is there flaw? | |
| 5 | 3 | | Is print light? | |
| 6 | 4 | Operating check | Lighting state satisfactory? | |
| 7 | 5 | | Operation state satisfactory? | |
| | ⋮ | ⋮ | ⋮ | ⋮ |

150: Do you wish setting for 'collective check'? [Yes] [No]

F I G. 15

160

161

| Sequence number | Input position | Input format | Guidance | Input flag |
|---|---|---|---|---|
| 1 | D2 | Date | Inspection date | 0 |
| 2 | D3 | Terms("no anomaly"\|"exchange required") | Dirt | 0 |
| 3 | D4 | Terms("no anomaly"\|"exchange required") | Flaw | 0 |
| 4 | D5 | Terms("no anomaly"\|"exchange required") | Print | 0 |
| 5 | D6 | Terms("operation normal"\|"operation anomaly") | Lighting state | 0 |
| 6 | D7 | Terms("operation normal"\|"operation anomaly") | Operation state | 0 |
| ⋮ | ⋮ | | ⋮ | ⋮ |

| Sequence number | Utterance template |
|---|---|
| 1 | ($four-digits integer "year" $two-digits integer "month" $two-digits integer "day")\|($two-digits integer "month" $two-digits integer "day") |
| 2 | "no anomaly"\|"exchange required" |
| 3 | "no anomaly"\|"exchange required" |
| 4 | "no anomaly"\|"exchange required" |
| 5 | "operation normal"\|"operation anomaly" |
| 6 | "operation normal"\|"operation anomaly" |
| ⋮ | ⋮ |

| ID | Regular expression |
|---|---|
| 1 | |
| 2 | (("in"("two"\|"three")"sequences collectively")\|("to"("flaw"\|"print")"collectively")) ("no anomaly"\|"exchange required") |
| 3 | (("in"("two")"sequences collectively")\|("to"("print")"collectively")) ("no anomaly"\|"exchange required") |
| 4 | |
| 5 | (("in"("two")"sequences collectively")\|("to"("operation state")"collectively")) ("operation normal"\|"operation anomaly") |
| 6 | |
| ⋮ | ⋮ |

| Sequence number | Regular expression |
|---|---|
| 2-4 | (("from"("dirt"\|"flaw")"to"("flaw"\|"print")"collectively")\|("appearance" "collectively")) ("no anomaly"\|"exchange required") |
| 5-6 | ("from"("lighting state")"to"("operation state") "collectively") ("operation normal"\|"operation anomaly") |
| ⋮ | ⋮ |

FIG. 19

```
("no anomaly"|"exchange required")
((("in"("two"|"three")"sequences collectively")|("to"("flaw"|"print")"collectively"))("no anomaly"|"exchange required"))|
((("from"("dirt"|"flaw")"to"("flaw"|"print")"collectively")|("appearance"  "collectively"))("no anomaly"|"exchange required"))|
((("from"("lighting state")"to"("operation state")"collectively")("operation normal"|"operation anomaly"))
```

| Sequence number | Keyword list | Grammar used for value |
|---|---|---|
| 1 | | |
| 2 | two sequences collectively<br>three sequences collectively<br>to flaw collectively<br>to print collectively | 2-4 |
| 3 | two sequences collectively<br>to print collectively | 2-4 |
| 4 | | |
| 5 | two sequences collectively<br>to operation state collectively | 5-6 |
| 6 | | |
| ⋮ | ⋮ | ⋮ |

F I G. 22

230

| Sequence number | Keyword list | Grammar used for value |
|---|---|---|
| 2-4 | from dirt to flaw collectively<br>from dirt to print collectively<br>from flaw to print collectively<br>appearance collectively | 2-4 |
| 5-6 | from lighting state to operation state collectively<br>operation collectively | 5-6 |
| ⋮ | ⋮ | ⋮ |

F I G. 23

240
| Sequence number | Utterance template |
|---|---|
| 1 | ($four-digits integer "year" $two-digits integer "month" $two-digits integer "day")\|($two-digits integer "month" $two-digits integer "day")\|"skip" |
| 2-4 | "no anomaly"\|"exchange required"\|"skip" |
| 5-6 | "operation normal"\|"operation anomaly"\|"skip" |
| ⋮ | ⋮ |
F I G. 24

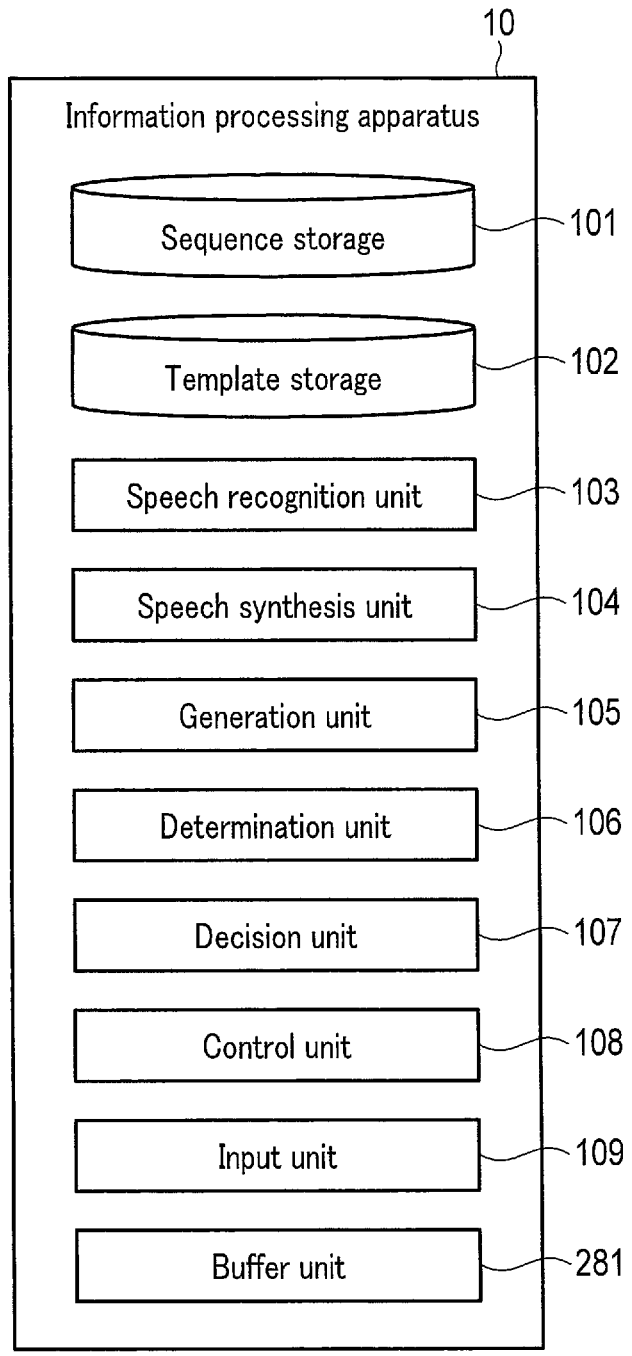
F I G. 28

| Sequence number | Grammar template | Grammar used for value |
|---|---|---|
| 1 | | |
| 2 | ("in"("two"\|"three")"sequences collectively")\|<br>("to"("flaw"\|"print")"collectively") | 2-4 |
| 3 | ("in"("two")"sequences collectively")\|<br>("to"("print")"collectively") | 2-4 |
| 4 | | |
| 5 | ("in"("two")"sequences collectively")\|<br>("to"("operation state")"collectively") | 5-6 |
| 6 | | |
| ⋮ | ⋮ | |

310

| Sequence number | Grammar template | Grammar used for value |
|---|---|---|
| 2-4 | ("from"("dirt"\|"flaw")"to"("flaw"\|"print") "collectively")\|("appearance" "collectively") | 2-4 |
| 5-6 | ("from"("lighting state")"to"("operation state") "collectively")\|("operation" "collectively") | 5-6 |
| ⋮ | ⋮ | |

("in"("two"\|"three")"sequences collectively")\|("to"("flaw"\|"print")"collectively")\|
("from"("dirt"\|"flaw")"to"("flaw"\|"print")"collectively")\|("appearance" "collectively")\|
("from"("lighting state")"to"("operation state")"collectively")\|("operation" "collectively")

FIG. 32

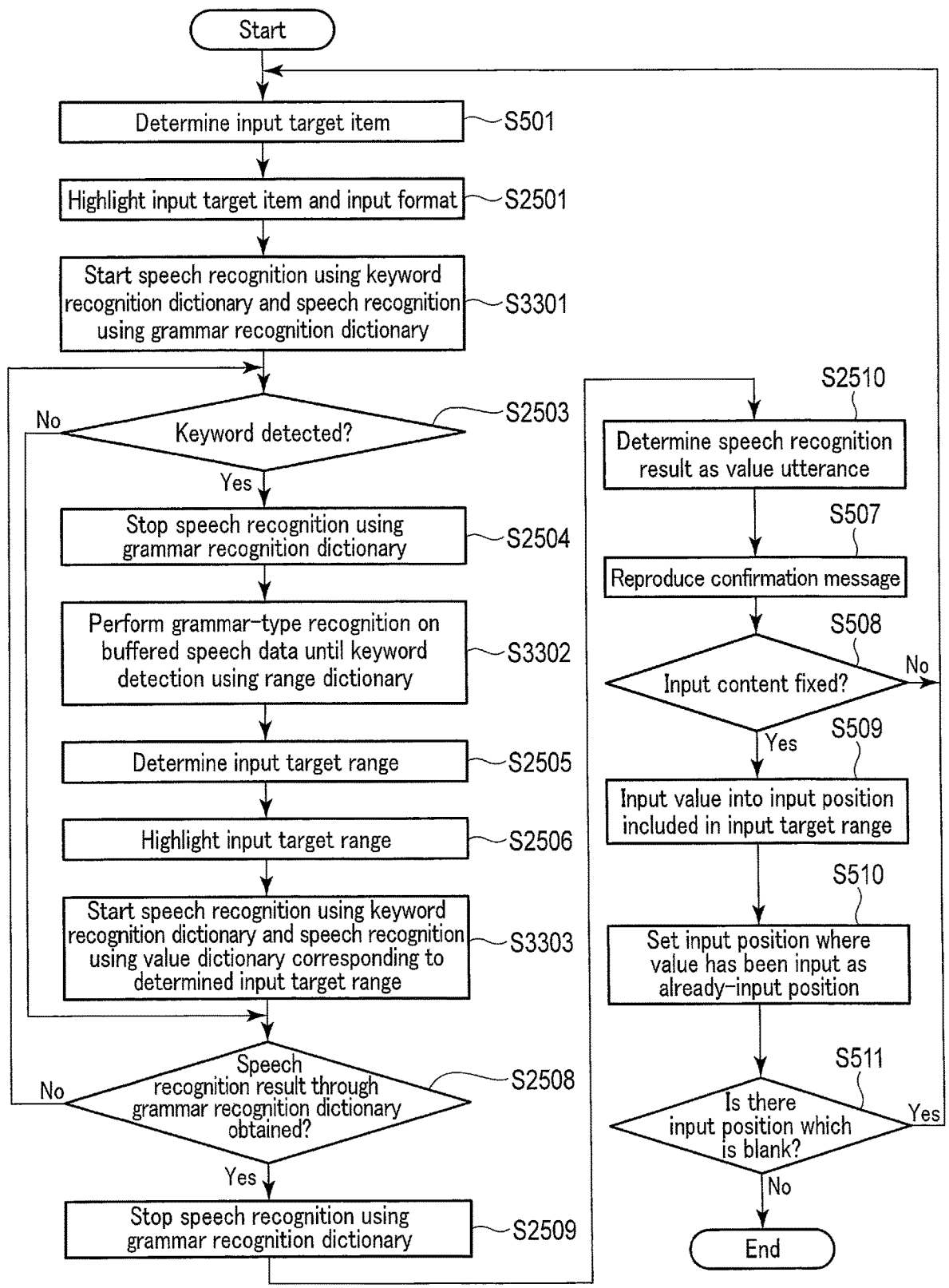
F I G. 33

|   | A | B | C | D |
|---|---|---|---|---|
| 1 |   |   |   | Inspection date |
| 2 | Test number | Test item | | 2021/02/15 |
| 3 | 1 | Appearance check | Is there dirt? |   |
| 4 | 2 | | Is there flaw? |   |
| 5 | 3 | | Is print light? |   |
| 6 | 4 | Operating check | Lighting state satisfactory? |   |
| 7 | 5 | | Operation state satisfactory? |   |
|   | ⋮ | ⋮ | ⋮ |   |

(352 — dashed box around column D rows 3-5)

|   | A | B | C | D |
|---|---|---|---|---|
| 1 |   |   |   | Inspection date |
| 2 | Test number | Test item | | 2021/02/01 |
| 3 | 1 | Appearance check | Is there dirt? | No anomaly |
| 4 | 2 | | Is there flaw? | No anomaly |
| 5 | 3 | | Is print light? | Slightly light |
| 6 | 4 | Operating check | Lighting state satisfactory? |   |
| 7 | 5 | | Operation state satisfactory? |   |
|   | ⋮ | ⋮ | ⋮ |   |

(351)

F I G. 35

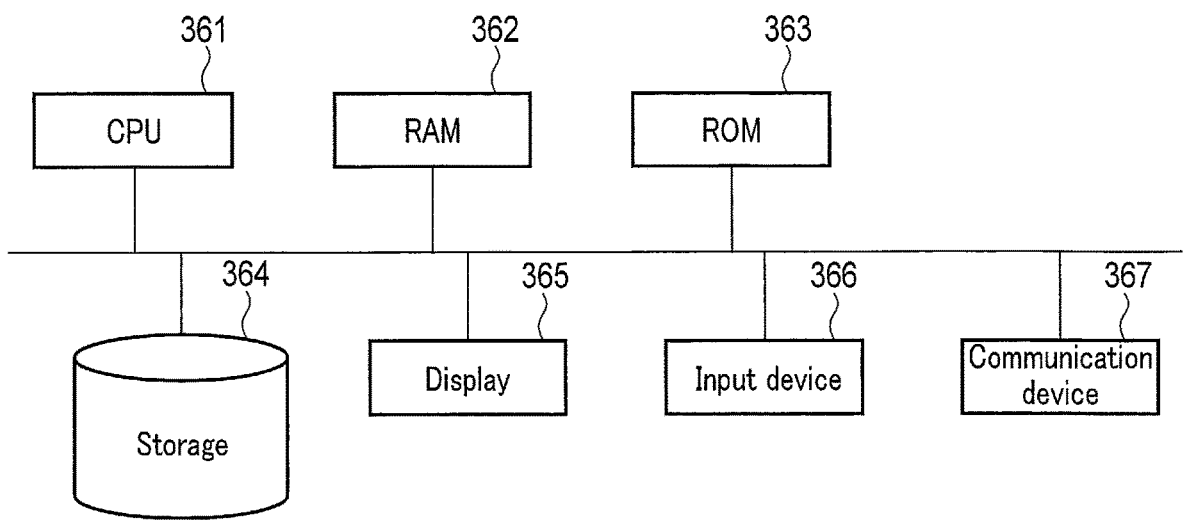
F I G. 36

INFORMATION PROCESSING APPARATUS, METHOD AND COMPUTER READABLE MEDIUM

This application is based upon and claims the benefit of priority from Japanese Patent Application No. 2021-117888, filed Jul. 16, 2021, the entire contents of which are incorporated herein by reference.

FIELD

Embodiments described herein relate to an information processing apparatus, method and computer readable medium.

BACKGROUND

In a manufacturing or maintenance scene, results measured by instrument and results of visual inspection may be input to data such as a form or a table, and shared between workers or between a worker and a client. Contents to be input to each data in a form or a table are determined in advance, and the worker conducts a work in accordance with a work sequence and inputs a result of the work to a predetermined data input position.

In business form software in general, a user inputs text with physical inputting device, e.g., a keyboard or a touch panel. However, since it takes time to input text data during a work, there is a demand for inputting data using speech input. For example, in a known method using an application other than business form software, by setting input target items and contents to be input to the respective items, a value can be input to the item that is selected when a user speaks. Further, in such a method, by specifying an item to be input after the subject input item is input in advance in initial setting, values can be successively input to items. However, when the user wishes to collectively input values into a plurality of ranges, it is necessary to set in advance the ranges of all combinations of items as ranges of possible utterances. This is not practical.

BRIEF DESCRIPTION OF THE DRAWINGS

FIG. 1 is a block diagram showing an information processing apparatus according to a first embodiment.

FIG. 2 is a diagram showing an example of recording data sheets according to the first embodiment.

FIG. 3 is a diagram showing an example of an input sequence list stored in a sequence storage according to the first embodiment.

FIG. 4 is a diagram showing an example of utterance templates stored in a template storage according to the first embodiment.

FIG. 6 is a flowchart showing details of an input target range decision process in step S505.

FIG. 7 is a diagram showing an example of a decision dictionary according to the first embodiment.

FIG. 10 is a diagram showing a specific example of the input process of the information processing apparatus according to the first embodiment.

FIG. 11 is a diagram showing a specific example of the input process of the information processing apparatus according to the first embodiment.

FIG. 12 is a diagram showing another example of a highlighted indication of the input target range.

FIG. 13 is a diagram showing an example in which the input sequence list is updated according to a modification of the first embodiment.

FIG. 14 is a diagram showing an example in which the input sequence list is updated according to another modification of the first embodiment.

FIG. 15 is a diagram showing an example of a presentation of an additional setting in the utterance templates.

FIG. 16 is a diagram showing an input sequence list stored in a sequence storage according to a second embodiment.

FIG. 17 is a diagram showing an example of a value dictionary according to the second embodiment.

FIG. 18 is a diagram showing an example of a first range dictionary according to the second embodiment.

FIG. 19 is a diagram showing an example of a second range dictionary according to the second embodiment.

FIG. 20 is a diagram showing an example of a speech recognition dictionary according to the second embodiment.

FIG. 22 is a diagram showing an example of a first keyword recognition dictionary according to a third embodiment.

FIG. 23 is a diagram showing an example of a second keyword recognition dictionary according to the third embodiment.

FIG. 24 is a diagram showing an example of a grammar recognition dictionary according to the third embodiment.

FIG. 28 is a block diagram showing an information processing apparatus according to a fourth embodiment.

FIG. 31 is a diagram showing an example of a second grammar recognition dictionary according to the fourth embodiment.

FIG. 32 is a diagram showing an example of a speech recognition dictionary according to the fourth embodiment.

FIG. 33 is a flowchart showing an input process of the information processing apparatus according to the fourth embodiment.

FIG. 35 is a diagram showing an operation example of the information processing apparatus according to a fifth embodiment.

FIG. 36 is a diagram showing an example of a hardware configuration of the information processing apparatus.

DETAILED DESCRIPTION

Figure 5:
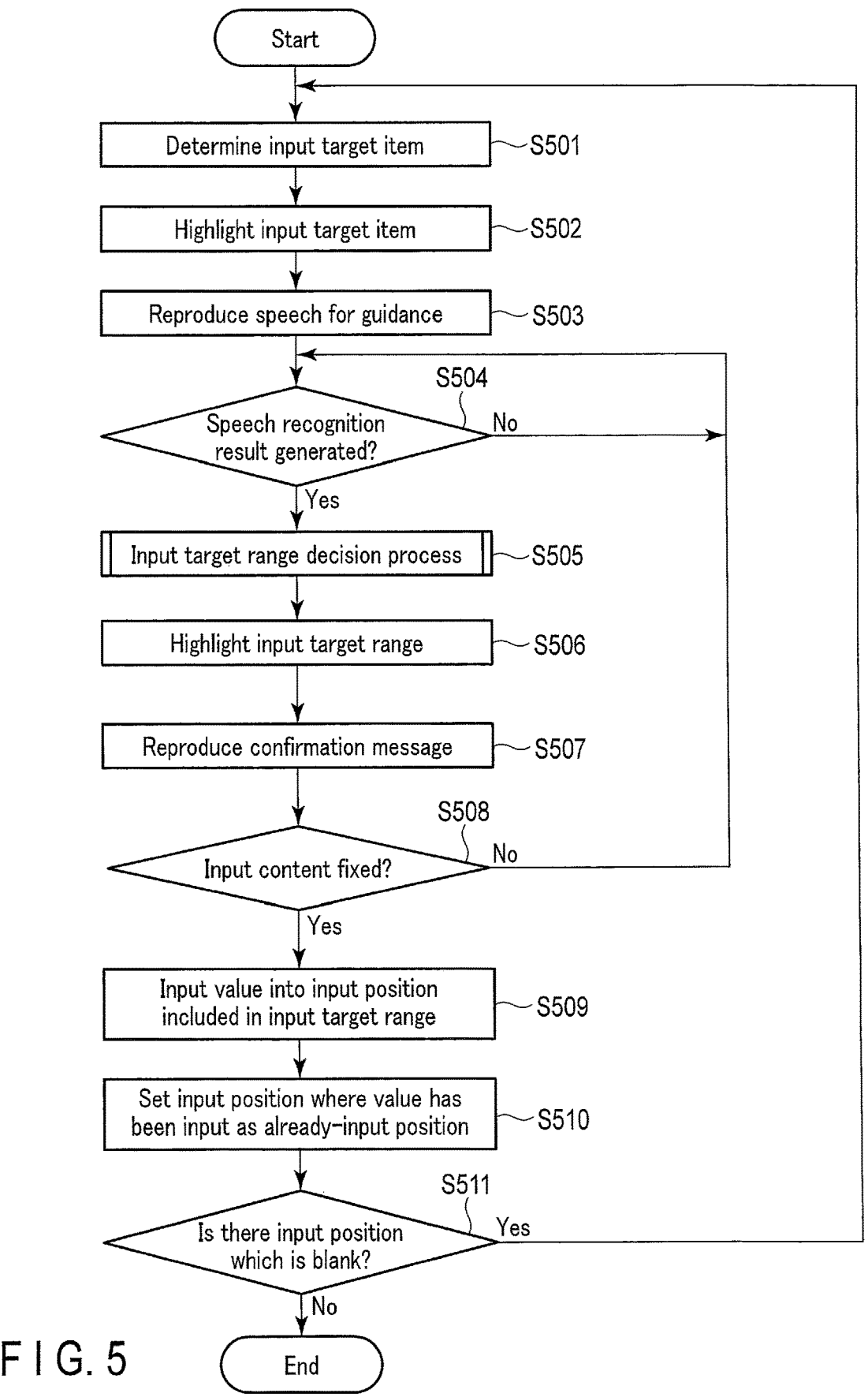
FIG. 5 is a flowchart showing an input process of the information processing apparatus according to the first embodiment.

In general, according to one embodiment, an information processing apparatus includes a processor. The processor generates a template, regarding recording data sheets including a plurality of items, for one or more of the items that can be specified, with reference to an input order of input target items selected from the items. The processor performs a speech recognition on an utterance of a user and generate a speech recognition result. The processor determines an input target range relating to one more items specified by the utterance of the user among the items based on the template and the speech recognition result.

Hereinafter, an information processing apparatus, method and computer readable medium according to embodiments will be described in detail with reference to the drawings. In the following embodiments, it is assumed that those portions with identical numbers perform the same operations, and repetitive explanations will be omitted.

First Embodiment

In the first embodiment, it is assumed that a value is input to form data by a speech input based on a free utterance of the user.

An information processing apparatus according to the first embodiment will be described with reference to a block diagram of FIG. 1.

An information processing apparatus 10 according to the first embodiment includes a sequence storage 101, a template storage 102, a speech recognition unit 103, a speech synthesis unit 104, a generation unit 105, a determination unit 106, a decision unit 107, a control unit 108, and an input unit 109.

The sequence storage 101 stores an input sequence list relating to an input order of a plurality of items included in recording data sheets. The recording data sheet is a data sheet, such as a form data sheet, an inspection data sheet, or an experimental data sheet, which is used to input a value with respect to an item.

The template storage 102 stores a template and a dictionary to detect an utterance of the user.

The speech recognition unit 103 performs speech recognition of an utterance of the user acquired through a microphone (not shown) or the like, and generates a speech recognition result. With regard to a speech recognition process, the speech recognition unit 103 included in the information processing apparatus 10 may include a speech recognition process engine, so that the speech recognition process can be performed inside the apparatus.

Alternatively, speech data concerning the utterance may be transmitted to a cloud or the like, and the speech recognition unit 103 may acquire a result of speech recognition processed by the cloud.

The speech synthesis unit 104 generates a synthetic speech of a content to be notified to the user, such as a guidance. The generated synthetic speech may be output through a loudspeaker (not shown).

The generation unit 105 generates a template relating to one or more items that can be specified, with reference to the input sequence list and based on the input order relating to the input target items. The input target items are items to be processed, selected from the items included in the recording data sheets.

The determination unit 106 determines an input target range relating to the one or more items specified by the utterance of the user among the plurality of items based on the template and the speech recognition result.

The decision unit 107 performs decisions of various conditions, and also decides a range specifying utterance to specify an input target range and a value utterance indicative of a value to be input into the input target range.

The control unit 108 performs various controls, and also highlights the input target range on the recording data sheets displayed on a display (not shown).

The input unit 109 performs various data inputs, and also performs a value input relating to a value utterance in the input target range.

An example of form data assumed in the first embodiment will now be described with reference to FIG. 2.

The recording data sheets assumed in this embodiment have an input format through which a value is input to a cell of a two-dimensional array, such as a sheet of spreadsheet software. In the following description, form data 20 is described as an example of the recording data sheets. In the example shown in FIG. 2, column indexes (A-D) are indicated in a horizontal direction, and row numbers (1-7) are indicated in a vertical direction. The form data 20 includes data items 21 corresponding to an inspection date and test items, such as "whether there is dirt" and "whether there is flaw". Each of the data items 21 is provided with an input position 22 through which the user inputs a value. The data items 21 may be classified into groups, such as "appearance check" and "operation check".

The input position 22 can be specified by a column index and a row number. In the example shown in FIG. 2, the input position 22 corresponding to the data item 21 "inspection date" can be expressed as "D2", and the value input thereto is "2021/02/15". The input position 22 corresponding to the data item 21 "whether there is dirt" can be expressed as "D3", and the value input thereto is "no anomaly".

The embodiment is not limited to the form data of a sheet of spreadsheet software having a two-dimensional array. The processing of the information processing apparatus 10 of the present embodiment is also applicable to even a free-description format in which input positions 22 are arranged at random, as long as the input position 22 corresponding to the data item 21 can be uniquely specified by an utterance of the user.

Next, an example of an input sequence list stored in the sequence storage 101 will be described with reference to FIG. 3.

An input sequence list 30 shown in FIG. 3 is a list indicating an order of the input positions through which the user inputs values. The input sequence list 30 is a table in which each sequence number is associated with an input position, a guidance, and an input flag. The input sequence list 30 may be retained in the same data as the form data 20 shown in FIG. 2, or may be retained as different data. Being retained in the same data means that the form data 20 and the input sequence list 30 are retained in one data file. Since general spreadsheet software can collectively manage a plurality of data sheets, the input sequence list 30 and the form data 20 may be retained on either the same data sheet or different data sheets.

The sequence number indicates the order of inputting the data items 21 into the form data 20. The input position is an identifier that uniquely specifies the input position 22 shown in FIG. 2. If the input position 22 is specified by a column index and a row number, for example, the identifier "D2" is used. The guidance is a content reproduced by a synthetic speech generated by a speech synthesis process by the speech synthesis unit 104, such as a title of the data item 21. The input flag is a flag indicating whether a value has been already input to the input position 22. For example, if a value has been already input, a flag "1" is allocated, and if no value has been input, a flag "0" is allocated.

In the example shown in FIG. 3, the sequence number "1", the input position "D2", the guidance "inspection date", and input flag "1" are associated with one another, and stored as one entry in the input sequence list 30.

Next, an example of utterance templates stored in the template storage 102 will be described with reference to FIG. 4.

The table shown in FIG. 4 stores a plurality of utterance templates which are possible patterns of utterances when the user specifies a range.

The utterance templates may include, for example, "in ${number of sequences} sequences collectively", "to ${ending point} collectively", and "from ${starting point} to ${ending point} collectively". The template "${ }" means placeholder which may be substituted by any utterance. In the example shown in FIG. 4, "${number of sequences}" included in the template represents a substitution target portion to be substituted by the number when an utterance regarding the number of sequences is input. For example, an utterance regarding a numeral, such as "3" or "5" is assumed. ${starting point} and ${ending point} respectively indicate a starting point and an ending point of a specified range based on the input sequence list. For example, it suffices that the template includes a sequence number, an identifier of the input position, a content of the guidance, etc. in the input sequence list 30 shown in FIG. 3. Specifically, in the case of indicating a range from "2" to "4" of the sequence numbers in the input sequence list 30 of FIG. 3, the template can be adapted to an utterance of, for example, "from 2 to 4 collectively", "from D3 to D5 collectively", or "from dirt to print collectively". A starting point and an ending point need not be specified by the same category in the input sequence list 30. In other words, the starting point may be specified by the category of the guidance, and the ending point may be specified by the category of the input position, such as "from dirt to D5 collectively".

The input process of the information processing apparatus 10 according to the first embodiment will be described with reference to the flowchart of FIG. 5. Before performing the input process for the form data, the input flags in the input sequence list are set in a not-input state by, for example, the control unit 108. In the example of FIG. 3, the input flags in the input sequence list 30 are set to "0".

In step S501, the determination unit 106 determines an input target item, namely, the data item 21 to be processed. For example, in accordance with the sequence numbers in the input sequence list, it suffices that the input position of the smallest sequence number of all entries having the input flag "0" is set as an input target item. In the process for a next input target item, namely, in the case where the process of step S501 is the process in the second time or later, it suffices that the determination is executed, for example, as follows: If the input target range (to be described later) is one input target item, or if the input target range includes a plurality of input positions but does not include an input target item, it suffices that the determination unit 106 sets an input position corresponding to the sequence number next to the currently-processed input position as an input target item. On the other hand, if the input target range includes a plurality of input positions and also includes an input target item, it suffices that the determination unit 106 sets an input position which corresponds to a sequence number greater than the last sequence number in the input target range and which is blank.

In step S502, the control unit 108 highlights an input position of the input target item. For example, an indication of surrounding the input position with a thick line is assumed.

In step S503, the speech synthesis unit 104 synthesizes a speech for a guidance to prompt the user to input an input position and reproduces the synthetic speech. For example, it suffices that a speech for guidance words corresponding to the input position of the input sequence list 30 is synthesized, and reproduced through a loudspeaker or the like.

In step S504, the decision unit 107 decides whether the speech recognition unit 103 has generated a speech recognition result from an utterance from the user or not. If a speech recognition result has been generated, the process proceeds to step S505. If a speech recognition result has not been generated, the process of step S504 is repeated. In the speech recognition process in the speech recognition unit 103, a filler or restating in an utterance is removed if necessary, by using an existing method.

In step S505, the generation unit 105, the determination unit 106, and the decision unit 107 performs an input target range decision process based on the input target item and the speech recognition result. As a result of the decision process, an input target range, and a value utterance, which is an utterance relating to a value to be input to the input position, are generated. Details of the input target range decision process will be described later with reference to FIG. 6.

In step S506, the control unit 108 highlights the input target range decided in step S505. The method of highlighting is similar to that in step S502.

In step S507, the speech synthesis unit 104 reproduces a confirmation message which prompts the user to confirm the input target range. The confirmation message may be a simple fixed phrase, such as "Is this OK?" Alternatively, the speech synthesis unit 104 may synthesize a speech for a message including the input target range so as to vocally repeat the input target range specified by the user, and may reproduce the synthetic speech.

In step S508, the decision unit 107 decides whether an input content is fixed or not. For example, when an utterance of consent or affirmative intention, such as "Yes" or "OK", is detected, or when the user depresses a predetermined button, the decision unit 107 can decide that the input content is fixed. If the input content is fixed, the process proceeds to step S509. If the input content is not fixed, namely, if an utterance that denies the input content is detected or a speech is re-input, the process returns to step S504, and the same process is repeated.

In step S509, the input unit 109 inputs data (for example, a numerical value or a character string) based on a value utterance to an input position included in the input target range.

In step S510, the input unit 109 sets the input position where a value has been input as an already-input position. Specifically, it suffices that the input unit 109 sets the corresponding input flag in the input sequence list to "1".

In step S511, the decision unit 107 decides whether there is an input target item which is blank in the input sequence list. If there is an input target item which is blank, the process returns to step S501, and the same process is repeated. On the other hand, if there is no input target item which is blank, in other words, if values are input to all input positions, the input process for the form data 20 by the information processing apparatus 10 is ended.

Next, details of the input target range decision process in step S505 will be described with reference to the flowchart of FIG. 6.

In step S601, the generation unit 105 generates a decision dictionary based on the input target item and the input sequence list. The decision dictionary is a dictionary storing a plurality of range specifying templates indicating an input position or a combination of a plurality of input positions that the user may utter for specifying an input position which is blank. Details of the decision dictionary will be described later with reference to FIG. 7.

In step S602, the decision unit 107 collates a speech recognition result with the decision dictionary, and decides whether the speech recognition result includes a range specifying utterance which is an utterance that includes an intention to specify a range. Specifically, if the speech recognition result includes a portion matching with a range specifying template, the matching portion of the speech recognition result is decided as a range specifying utterance. If the speech recognition result includes a range specifying utterance, the process proceeds to step S603. If the speech recognition result does not include a range specifying utterance, the process proceeds to step S605.

In step S603, the decision unit 107 decides a portion of a character string which is the speech recognition result and which precedes the range specifying utterance as a value (for example, a character string) that the user desires to input in the input position, and decides the portion preceding the range specifying utterance as a value utterance.

In step S604, the determination unit 106 determines one or more input positions specified by the range specifying utterance as the input target range.

Thereafter, the process proceeds to step S506 shown in FIG. 5. The order of the processes of step S603 and step S604 is not determined, and whichever step may be performed earlier.

In step S605, the decision unit 107 decides the entire speech recognition result as a value utterance.

In step S606, the determination unit 106 determines one current input target item as an input target range. Thereafter, the process proceeds to step S506 shown in FIG. 5. The order of the processes of step S605 and step S606 is not determined, and whichever step may be performed earlier.

Although not shown in the flowcharts of FIG. 5 and FIG. 6, the speech recognition unit 103 may perform switch control relating to start and stop of recording of the utterance of the user and the speech recognition process. For example, the speech recognition unit 103 may start recording of the utterance of the user and the speech recognition process at a timing when receiving the utterance from the user, such as after outputting the speech for the guidance in step S503, after outputting the confirmation message in step S507, or the like. If the speech recognition result is generated, the speech recognition process is stopped thereafter to prevent a synthetic speech output from the information processing apparatus 10 from being diverted to the microphone and subjected to the speech-recognition process together with the utterance of the user.

In the case of applying a signal processing that will not cause a synthetic speech from the information processing apparatus 10 to be diverted to the microphone, the switch control mentioned above need not be executed and the speech recognition process may be kept performed while the input process shown in FIG. 5 is being performed.

Next, an example of the decision dictionary according to the first embodiment will be described with reference to FIG. 7.

The decision dictionary 70 shown in FIG. 7 includes a plurality of range specifying templates 71. The range specifying templates 71 include a regular expression. The regular expression is generated by replacing a substitution target portion for an arbitrary input included in the utterance templates with a regular expression.

For example, a regular expression 72 of the ID "1" can be generated by replacing "${number of sequences}", which is a substitution target portion included in the utterance templates, with "(?<number of sequences>¥d+)". The regular expression 72 of the ID "2" corresponds to a case in which the substitution target portion included in the utterance templates exists in only "${ending point}", and can be generated by replacing the substitution target portion with a union of identifiers and guidances of the input sequences that follow the current input sequence.

The regular expression 72 of the ID "3" corresponds to a case in which the substitution target portion included in the utterance templates exists in both "${starting point}" and "${ending point}". The starting point can be replaced with a union of input positions and guidances of entries other than the last entry of the input sequence list. The ending point can be replaced with a union of input positions and guidances of entries other than the first entry of the input sequence list.

In the case of a range specifying utterance, matching portions of the number of sequences, the starting point, the ending point, etc. can be specified from a portion that matches a regular expression in the range specifying templates. Specifically, in the case of specifying the number of sequences, the sequence number in the input sequence list that corresponds to the current input target item is the starting point, and the sequence number corresponding to a numerical value obtained by subtracting 1 from the uttered number of sequences is the ending point. More specifically, in the case where the entry of the sequence number "2" in FIG. 3 is an input target item, if the user utters "no anomaly in four sequences collectively", the range specifying utterance is "four sequences collectively", and the sequence number corresponding to the ending point is calculated by 2+4−1=5. Thus, the input positions (D3 to D6) corresponding to the entry of the sequence number "5" are the input target range. Therefore, the input position of the corresponding entry can be an input target range, regardless of whichever of the number of sequences, the identifier of the input position, and the guidance in the input sequence list 30 is specified.

Similarly, in the case of specifying the starting point and the ending point, for example, when a speech recognition result "from dirt to print collectively" is obtained, the input position as the starting point corresponding to the guidance "dirt" is "D3", and the input position as the ending point corresponding to the guidance is "D5" with reference to the input sequence list of FIG. 3. Therefore, the input target range can be set to "D3 to D5".

The decision dictionary 70 is not necessarily generated in step S601, but may be generated before the speech recognition process in step S504.

Furthermore, the regular expression may be generated based on not only those shown in FIG. 7, but based on another expression that can specify an input position included in the input sequence list.

Next, another example of the decision dictionary according to the first embodiment will be described with reference to FIG. 8.

Figure 8:
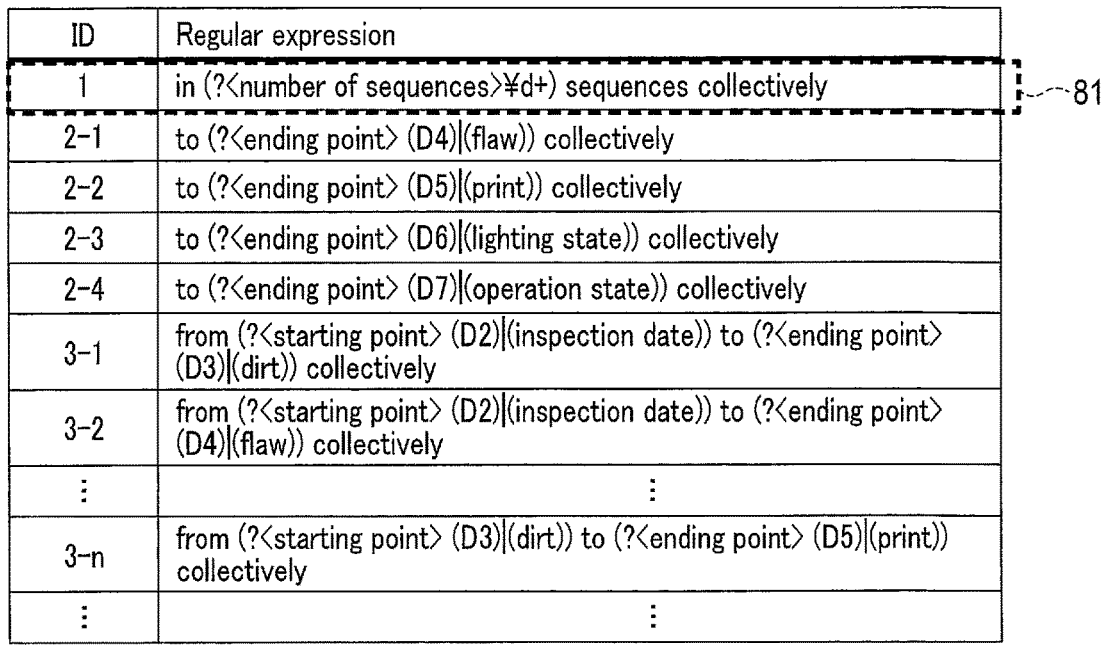
FIG. 8 is a diagram showing another example of the decision dictionary according to the first embodiment.

As a decision dictionary 80 shown in FIG. 8, a plurality of range specifying templates 81 may be set from one template. For example, the range specifying template 71 of the ID "2" in FIG. 7 is expressed as "to (?<ending point>(D4)|(D5)|(D6)|(D7)| . . . |(flaw)|(print)|(lighting state)|(operation state)| . . . ) collectively" as a regular expression. The symbol "A|B" is a non-terminal symbol representing that "A" or "B" is recognized.

In the range specifying templates 81 shown in FIG. 8, the conditions may be divided into the regular expression 72 "to (?<ending point>(D4)|(flaw)) collectively" of ID "2-1", the regular expression 72 "to (?<ending point>(D5)|(print)) collectively" of ID "2-2", the regular expression 72 "to (?<ending point>(D6)|(lighting state)) collectively" of ID "2-3", and the regular expression 72 "to (?<ending point>(D7)|(operation state)) collectively" of ID "2-4".

Furthermore, the range specifying template 71 of the ID "3" in FIG. 7 can be a combination of the starting point and the ending point. In the range specifying template 81 in FIG. 8, it suffices that for a set of the sequence numbers i and j (i and j are natural numbers, where i<j), a union of corresponding input positions and guidances of entries included in the input sequence list is substituted to the substitution target portion.

Next, a specific example of an input process of the information processing apparatus 10 according to the first embodiment will be described with reference to the flowcharts of FIGS. 5 and 6, and FIG. 9 to FIG. 12.

Figure 9:
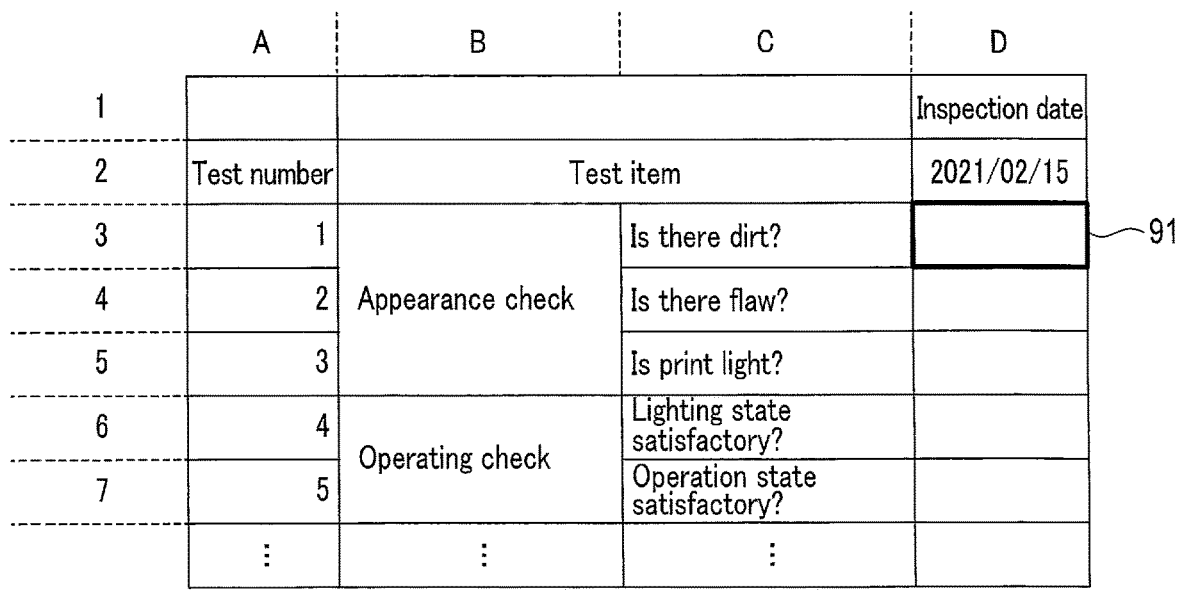
FIG. 9 is a diagram showing a specific example of the input process of the information processing apparatus according to the first embodiment.

FIG. 9 is a diagram showing an example of a display of the form data 20 displayed by the control unit 108 when a process is started for the entry of the sequence number "2" in the input sequence list 30 shown in FIG. 3.

Since the entry of the sequence number "2" corresponds to the input position "D3", the input position "D3" in the form data 20 is highlighted through the process of step S502. In the example of FIG. 9, the cell of D3 is highlighted with a thick frame 91 surrounding the cell.

Through the process of step S503, for example, the speech synthesis unit 104 generates a synthetic speech "is there 'dirt'?" as a speech guidance using the word "dirt" in the items of the guidance in the input sequence list 30, and notifies the user of the synthetic speech. In this embodiment, it is assumed that user who heard the synthetic speech utters "no anomaly from dirt to print collectively".

Through the process of step S504, the speech recognition unit 103 generates a speech recognition result "no anomaly from dirt to print collectively".

Subsequently, in step S601, the generation unit 105 generates a decision dictionary relating to the entry of the sequence number "2" in FIG. 7. In step S602, the decision unit 107 decides whether the speech recognition result includes a range specifying utterance. Here, a portion of the speech recognition result "from dirt to print collectively" matches the regular expression 72 of the ID "3" in the decision dictionary, which is the range specifying template 71 including the starting point and the ending point. Therefore, "from dirt to print collectively" is decided to be a range specifying utterance. Accordingly, through step S603, the utterance "no anomaly" before "from dirt to print collectively" is set as a value utterance. Through step S604, the determination unit 106 sets an input target range "D3 to D5" with the starting point "D3" corresponding to "dirt" and the ending point "D5" corresponding to "print" in the regular expression 72 based on the range specifying utterance "from dirt to print collectively" and the input sequence list shown in FIG. 3.

As a result, through the highlighting process in step S506, the three cells from "D3" to "D5" corresponding to the input target range is highlighted with the thick frame 91 as shown in FIG. 10. Thus, the user can easily decide whether the desired input target range has been set by the user's own utterance.

Through the processes of steps S507 and S508, if the information processing apparatus has acquired an utterance of consent from the user relating to the setting of the input target range shown in FIG. 10, a character string 1101 "no anomaly" which is a value of the value utterance is input to the input target range, namely, each cell of D3, D4, and D5 as shown in FIG. 11 through the process of step S509. Thereafter, although not shown in FIG. 11, "1" is set to the input flag of the entries respectively corresponding to the input positions D3 to D5 in the input sequence list shown in FIG. 3.

The input target range includes a plurality of input positions of D3 to D5 and also includes the current input target item D3. Therefore, regarding the input target items for subsequent processing when the process returns to step S501, it suffices that the determination unit 106 determines, as a next input target item, an input position which has a sequence number greater than the last sequence number "4" (the input position D5) of the input target range and which is blank, namely, the sequence number "5" (the input position D6) in the example shown in FIG. 3.

Although not shown, if the user utters "there is graffiti" in the state of FIG. 9, the speech recognition unit 103 generates a speech recognition result "there is graffiti" through the process of step S504. In this case, through step S602, it is decided that there is no range specifying template having a regular expression which matches the speech recognition result "there is graffiti". Through step S605, the speech recognition result "there is graffiti" as a whole is set as a value utterance. Through step S606, the input position "D3" of the input target item is set as an input target range, and a character string "there is graffiti" is input to the input position "D3".

In the examples shown in FIGS. 9 and 10, highlighting is indicated with thick frames surrounding the input positions. However, the highlighted indication is not limited to this, but may be blinking or coloring of the frames.

FIG. 12 shows another example of a highlighted indication of the input target range. In the example shown in FIG. 12, an input target range 1201 is highlighted by coloring the input target range 1201 with a color different from those of the other cells. Such a highlighted indication may be any indication as long as it is different from those of the cells other than the input target range 1201.

According to the first embodiment described above, a dictionary for collective inputting that allows an input for a plurality of items with reference to the input target item is generated in accordance with the input sequence list, and a speech recognition process is performed for the user's utterance, and one or more input positions corresponding to input target range and a value to be input to the input positions are extracted, and a value to be input is input to the input target range. Accordingly, while carrying out a work, the user can collectively input values into one or more input positions in a recording data sheet, such as form data, simply by uttering and specifying an input range which the user desires for a work result or an inspection result.

Thus, the user does not need to switch to specify a range mode and can unconsciously perform an individual input and a collective input with no burden of additional settings. As a result, speech data can be input efficiently, thereby improving the efficiency and convenience in data inputting with speech. Therefore, the work time for inputting data into a recording data sheet, such as a form, can be reduced.

Modification of First Embodiment

In the information processing apparatus 10 according to the first embodiment, it is assumed that available items as guidances are acquired from form data and an input sequence list is generated before operation. However, a word to specify an input target range may be added to the input sequence list in an actual operation, thereby updating the templates.

Examples of updating the input sequence list will be described with reference to FIGS. 13 and 14.

In the input sequence list 130 shown in FIG. 13, to use the words "appearance check" and "operation check" in the test items in FIG. 2 as words to specify an input target range, the item of a group 131 is added by the user to the input sequence list.

In FIG. 14, an utterance template 141 "${group} collectively" is newly added. Accordingly, for example, if the utterance "appearance collectively" is acquired as a speech recognition result, the decision unit 107 can decide "dirt (D3)", "flaw (D4)", and "print (D5)", which are entries corresponding to the group of "appearance", as an input target range with reference to the input sequence list shown in FIG. 13.

The user does not need to manually update the input sequence list or the utterance templates. The information processing apparatus 10 may learn the user's tendency of specifying an input target range, and present addition of a new utterance template or present an option for a new utterance template to the user. Alternatively, the information processing apparatus 10 may automatically add a new utterance template.

FIG. 15 shows an example in which the information processing apparatus 10 presents additional setting of an utterance template relating to an input target range.

It is assumed that, when the input process for form data is performed a plurality of times, for example, the same input target range including a plurality of input positions is set a predetermined number of times or more. The decision unit 107 may decide that the user specifies the input target range at a high frequency, and may prompt the user to add a new utterance template so that the user can specify the input target range with a shorter utterance. Specifically, if the input target range is specified a predetermined number of times with a plurality of words including a starting point and an ending point, such as "from D3 to D5 collectively", the decision unit 107 decides to prompt the user to add an utterance template.

The control unit 108 displays a message 150 which prompts the user to add an utterance template relating to the input target range, for example, "Do you wish setting for collective check?" If the user's answer is "yes", it suffices that the user inputs, by speech or text, a word "appearance", "look", or "outside", namely, a title with which the user can easily specify the input target range, in the example shown in FIG. 15. As a result, the input sequence list and the utterance templates are updated as shown in, for example, FIGS. 13 and 14. Next time the process is performed or thereafter, the input target range from D3 to D5 can be specified by the user's utterance of "appearance collectively", "look collectively", or "outside collectively".

In the case of prompting the user to add an utterance template, a criterion of the decision is not limited to a rule base, such as a predetermined number of times or more, and an utterance template may be added based on a trained model obtained by machine learning. For example, in conventional supervised learning, a model is trained in accordance with the training data using an input target item as input data and the user's tendency of specifying an input target range as correct answer data. Additional setting of an utterance template may be recommended based on the trained model generated as a result of the training.

According to the modification of the first embodiment described above, additional setting of an utterance template is prompted in accordance with the user's tendency of specifying an input target item. As a result, a title with which the user can easily specify the input target range can be added as an utterance template, and a value can be efficiently input with speech. In addition, the efficiency and convenience in data input by speech can be improved.

Second Embodiment

The second embodiment differs from the first embodiment in that an utterance of a specific format is speech-recognized and processed. In the first embodiment, a free-form speech is assumed. However, work sites or the like are generally noisy, and a speech recognition process for a free-form utterance may not be correctly performed. The information processing apparatus according to the second embodiment can improve the accuracy of the speech recognition process by performing an input process for only an utterance that complies with a specific format, so that an input process for form data with speech can be performed even in noisy environments.

In the information processing apparatus according to the second embodiment, a generation unit 105 generates a speech recognition dictionary for use in recognition of only an utterance that complies with a specific grammar in the speech recognition process. A template storage 102 stores a speech recognition dictionary. In the second embodiment, the speech recognition dictionary is also referred to as a grammar recognition dictionary. The components other than the generation unit 105 and the template storage 102 perform the same operations as those of the first embodiment. Therefore, explanations thereof are omitted here.

Next, an example of the input sequence list stored in a sequence storage 101 according to the second embodiment will be described with reference to FIG. 16.

An input sequence list 160 shown in FIG. 16 includes an item of an input format 161 in addition to the input sequence list 30 shown in FIG. 3.

The input format is a format to accept an utterance having a content constituted with a specific grammar in the speech recognition process, and used to generate a speech recognition dictionary. For example, the input format specifies words of "date", "terms ('no anomaly'|'exchange required')", "terms ('operation normal'|'operation abnormal')", etc. The input format also specifies a pattern recognized by the speech recognition unit 103, such as "a numerical value (three-digit integer)", "a numerical value (two-digit integer and single-digit decimal fraction)", "five alphanumeric characters", etc.

Specifically, the data item of an inspection date in the form data is set to the input format of "date", so that only an utterance of a date can be recognized. The data item of dirt is set to "terms ('no anomaly'|'exchange required')", so that only "no anomaly" or "exchange required" can be accepted.

An example of a speech recognition dictionary generated by a decision unit 107 will be described with reference to FIGS. 17 to 19.

The speech recognition dictionary according to the second embodiment includes three types of dictionary: a value dictionary to recognize a value of an input format of the input target item; a first range dictionary to recognize a range specifying utterance with the input target item as a starting point; and a second range dictionary to recognize a range specifying utterance that can be input anytime.

First, an example of the value dictionary is shown in FIG. 17.

A value dictionary 170 is a dictionary in which a sequence number is associated with a grammar template. Through the value dictionary 170, only a speech recognition result that matches the grammar template can be input to the input position corresponding to the sequence number. For simplicity, it is assumed that the dictionary for a numerical value input uses a grammar of another definition "$N-digit integer". In the input sequence of the sequence numbers 2-4, utterances are recognized as "no anomaly" or "exchange required". And in the input sequence of the sequence numbers 5 and 6, utterances are recognized as "operation normal" or "operation abnormal".

Next, an example of the first range dictionary is shown in FIG. 18.

The first range dictionary 180 is a dictionary in which a sequence number is associated with a regular expression. Through the first range dictionary 180, only consecutive input sequences of the same input format can be collectively input. For example, if the input sequence of the sequence number "2" is the starting point, only the sequence numbers from "2" to "3" or "4" that fall within a range of the same input format can be collectively input. Specifically, the utterance that specifies the number of sequences, such as "two sequences collectively" or "three sequences collectively", or the utterance that directly specifies an input position as the ending point, such as "to 'flaw' collectively" or "to 'print' collectively" can be used. "('no anomaly'|'exchange required')" is similar to that in the value dictionary in FIG. 17.

On the other hand, if the input sequence of the sequence number "3" is the starting point, only the sequence numbers "3" and "4" fall within a range of the same input format. Therefore, the utterance "three sequences collectively" cannot be accepted and only the utterance "two sequences collectively" can be accepted.

In the example shown in FIG. 18, the words that are set in the item of "guidance" in the input sequence list are used. However, any other item, such as the sequence number, may be used to specify the input target range in the same manner as in the first embodiment.

Next, an example of the second range dictionary is shown in FIG. 19.

The second range dictionary 190 is a dictionary in which a sequence number is associated with a regular expression. The second range dictionary 190 is a dictionary on the assumption of an utterance that can be processed regardless of which sequence number is an input target item. Dictionaries for each set of a plurality of consecutive input sequences of the same input format are generated, so that the user can input values for input positions of the same input format collectively. In the example of FIG. 19, to represent the range of the sequence numbers "2-4", an utterance specifying the starting point and the ending point, such as "from dirt to print" and an utterance specifying "a group" in the input sequence list, such as "appearance collectively" can be used. "('no anomaly'|'exchange required')" subsequent to the regular expression 73 is similar to that in the first range dictionary 180 in FIG. 18. Similarly, regarding the second range dictionary 190, any other item, such as the sequence number, may be used to specify the input target range.

FIGS. 17 to 19 show an example in which the value dictionary 170, the first range dictionary 180, and the second range dictionary 190 are generated as individual dictionaries. However, the embodiment is not limited to this example, and one speech recognition dictionary may be generated in which a value template is associated with a regular expression on the assumption of an utterance range.

Next, an example of the speech recognition dictionary is shown in FIG. 20.

Specific entries of the value dictionary 170, the first range dictionary 180, and the second range dictionary 190 shown in FIGS. 17 to 19 are combined, so that a speech recognition dictionary 200 (also referred to as a grammar recognition dictionary 200) can be generated in which the entry of each sequence number is an input target item. In the example shown in FIG. 20, entries where the sequence number "2" is an input target item are extracted from each of the value dictionary 170, the first range dictionary 180, and the second range dictionary 190.

The input format to specify a range, such as "'to' ('flaw'|'print') 'collectively'" included in the speech recognition dictionary 200 may be generated from the range specifying template shown in FIG. 7.

Figure 21:
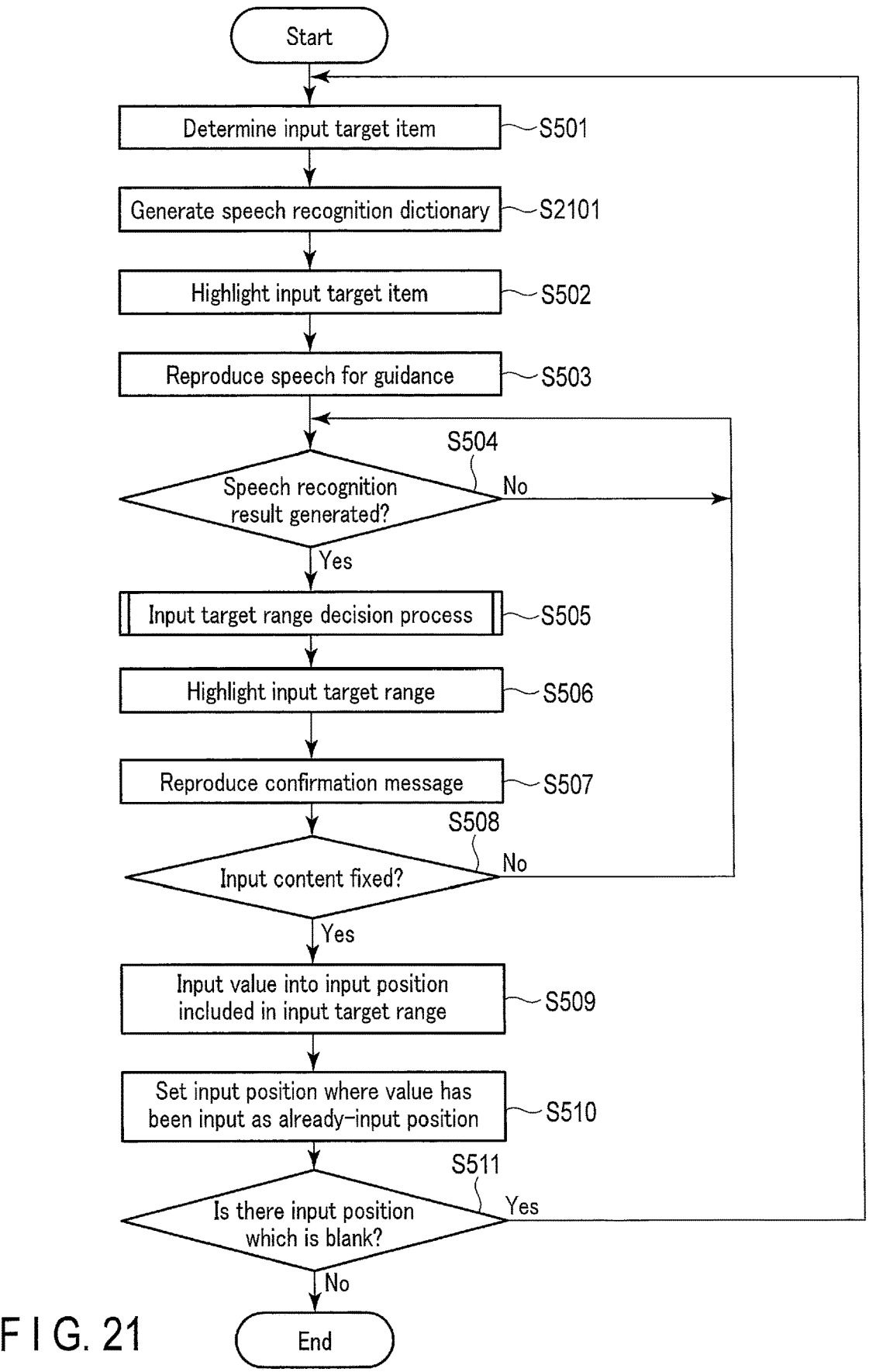
FIG. 21 is a flowchart showing an input process of the information processing apparatus according to the second embodiment.

Next, the input process of the information processing apparatus 10 according to the second embodiment will be described with reference to the flowchart of FIG. 21.

In the second embodiment, it is assumed that the value dictionary, the first range dictionary, and the second range dictionary are generated in advance based on the input sequence list before the information processing apparatus 10 performs the input process. However, the dictionaries may be generated before the speech recognition process in the input process is performed.

In step S2101 subsequent to step S501 in which an entry corresponding to a sequence number in the input sequence list is set as an input target item, the generation unit 105 generates a speech recognition dictionary corresponding to the sequence number in the input target item based on the value dictionary, the first range dictionary, and the second range dictionary.

In step S504, the speech recognition unit 103 performs a speech recognition process based on the speech recognition dictionary. In the speech recognition process, since only an utterance corresponding to an input format included in the speech recognition dictionary is accepted, an utterance other than the input format in the speech recognition dictionary is rejected and no speech recognition result is generated. Therefore, if any speech recognition results are not generated for a certain period of time, a synthetic speech such as "Speech recognition failed. Speak again." may be output to prompt a re-input.

In step S505, in which the decision unit 107 decides an input target range, if the recognition result contains information about which of the character strings of the input formats of the value dictionary, the first range dictionary, and the second range dictionary is used for recognizing the user's utterance, the decision unit 107 may decide that the utterance is a range specifying utterance when the first range dictionary or the second range dictionary is used for recognizing. If the recognition result doesn't contain information about the used character strings of dictionaries, the decision unit 107 may decide an input target range with reference to the input sequence list and the range specifying template in the same manner as in the first embodiment.

According to the second embodiment described above, the speech recognition dictionary (the grammar recognition dictionary) specifying an input format including a format of an utterance specifying an input range is generated. The speech recognition process is performed by using the generated dictionary, so that only a value that matches the input format is recognized. As a result, the speech recognition accuracy can be improved, and the efficiency and convenience in data input with speech can be improved in the same manner as in the first embodiment.

Third Embodiment

The third embodiment performs the speech recognition process specifying an input format as in the second embodiment, and differs from the second embodiment in that a speech recognition process of keyword detection type which does not need detection of a speech section is performed. Since the speech recognition process of keyword detection type which does not need detection of a speech section is used in combination of the speech recognition process of the second embodiment, an input target range can be specified and presented to the user even before an utterance is completed.

In an information processing apparatus 10 according to the third embodiment, a generation unit 105 generates a speech recognition dictionary for keyword detection (a keyword recognition dictionary) and a speech recognition dictionary specifying a grammar as an input format (a grammar recognition dictionary). A speech recognition unit 103 performs two types of speech recognition process using the keyword recognition dictionary and the grammar recognition dictionary. The other configurations are similar to those of the above embodiments, and explanations thereof are omitted.

Next, an example of the keyword recognition dictionary according to the third embodiment will be described with reference to FIGS. 22 and 23. The keyword recognition dictionary includes a first keyword recognition dictionary, which is a dictionary to detect a range specifying utterance with a sequence number as a corresponding starting point, and a second keyword recognition dictionary, which is a dictionary to detect an utterance that can be input anytime.

A first keyword recognition dictionary 220 shown in FIG. 22 corresponds to the first range dictionary 180 of the second embodiment shown in FIG. 18, in which a sequence number, a keyword list, and a grammar used for a value are associated with one another. The keyword list indicates keywords to form a dictionary to detect an utterance corresponding to a keyword. The grammar used for a value input indicates sequence numbers of the grammar corresponding to the grammar recognition dictionary shown in FIG. 24 (described later). The first keyword recognition dictionary 220 stores a keyword representing the ending point of an input target range in the case where an entry of each sequence number is an input target item. For example, regarding the sequence number "2", the same value as for the sequence number "2" can be input for the items of "dirt", "flaw", and "print". Therefore, the keyword "to flaw collectively" indicates the input positions corresponding to "dirt" and "flaw" (D3 and D4). Similarly, the keyword "to print collectively" indicates the input positions corresponding to "dirt", "flaw", and "print" (D3 to D5).

A second keyword recognition dictionary 230 shown in FIG. 23 corresponds to the second range dictionary 190 of the second embodiment shown in FIG. 19, in which a sequence number, a keyword list, and a grammar used for a value are associated with one another. The second keyword recognition dictionary 230 is used to detect an utterance that specifies a range specifying a starting point and an ending point that can be spoken anytime regardless of the sequence numbers, and an utterance that specifies a group.

Thus, the first keyword recognition dictionary 220 and the second keyword recognition dictionary 230 are used to detect a range specifying utterance. The first keyword recognition dictionary 220 and the second keyword recognition dictionary 230 may be generated by expanding non-terminal symbols of the grammar in the range specifying portions in the first range dictionary 180 shown in FIG. 18 and the second range dictionary 190 shown in FIG. 19 according to the second embodiment. Even when either of the first keyword recognition dictionary 220 and the second keyword recognition dictionary 230 is generated, the input process can be executed in the same manner.

Next, an example of the grammar recognition dictionary according to the third embodiment will be described with reference to FIG. 24.

The grammar recognition dictionary 240 shown in FIG. 24 is a dictionary to recognize a value utterance, and is similar to the value dictionary 170 of the second embodiment shown in FIG. 17. The grammar recognition dictionary 240 includes sequence numbers and grammar templates. The grammar templates are similar to the grammar templates shown in FIG. 17. In the example shown in FIG. 24, the input format of the sequence numbers "2-4" is "no anomaly" or "exchange required" with reference to the input sequence list 160 shown in FIG. 16. Therefore, the grammar template "no anomaly"|"exchange required"|"skip" is set.

"Skip" means skipping of an input into an input target range. If "skip" is acquired as a value utterance, an input unit 109 inputs nothing into the input target range, or may input a symbol meaning no data, such as "N/A". For convenience of explanation, "skip" has been described above based on the grammar recognition dictionary according to the third embodiment. However, even when "skip" is decided as an utterance value in the first embodiment or included in the value dictionary 170 in the second embodiment, the input unit 109 may perform a similar process.

Furthermore, in the example of FIG. 24, sequence numbers of groups of the same input format are collectively indicated, but a grammar template may be set for each of the sequence numbers. The grammar recognition dictionary 240 may be generated for each input format, instead of each sequence number.

Figure 25:
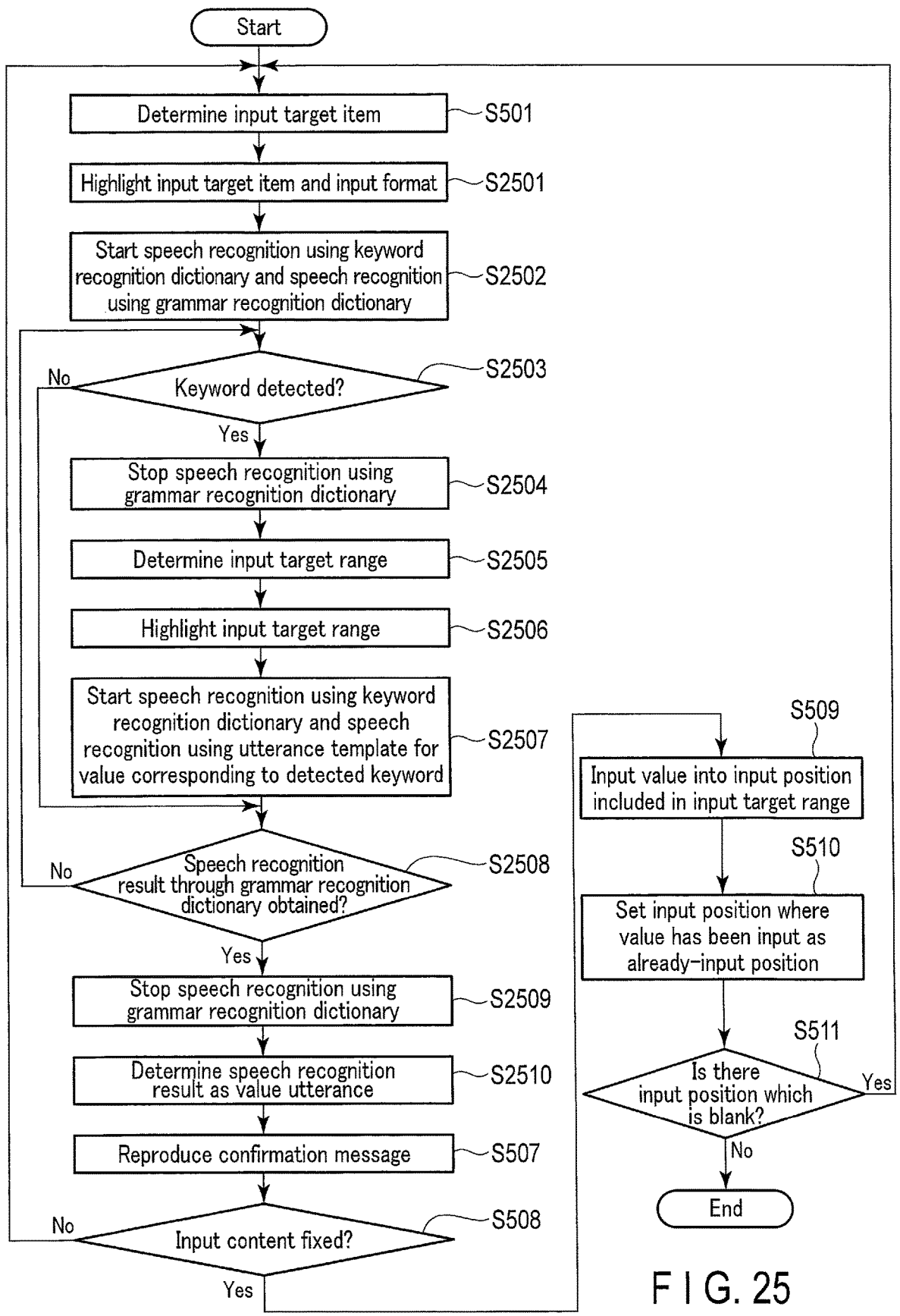
FIG. 25 is a flowchart showing an input process of the information processing apparatus according to the third embodiment.

Next, the input process of the information processing apparatus 10 according to the third embodiment will be described with reference to the flowchart of FIG. 25.

In step S2501, a control unit 108 highlights an input position of an input target item, and further displays to the user a content that can be recognized by the speech recognition based on the input format of the current input target item. For example, if the input format is "words ('no anomaly'|'exchange required')", it suffices that a text "'no anomaly', 'exchange required'" is displayed on the screen. The text may be displayed, for example, on form data, or on a margin such as a status bar. Alternatively, another window may be prepared, so that the text may be displayed in the window. Furthermore, the input format is not necessarily displayed as a text. A synthetic speech such as "please utter either 'no anomaly' or 'exchange required'" may be generated and notified to the user.

In step S2502, the speech recognition unit 103 starts a speech recognition process using a keyword recognition dictionary corresponding to the input sequence number, and starts a speech recognition process using a grammar recognition dictionary corresponding to the current input sequence number. In the following, the speech recognition process using the keyword recognition dictionary is also simply referred to as keyword detection, and the speech recognition process using the grammar recognition dictionary is also simply referred to as grammar-type recognition. Specifically, the keyword recognition dictionary includes a first keyword recognition dictionary and a second keyword recognition dictionary. The grammar recognition dictionary is a value dictionary.

In step S2503, the decision unit 107 decides whether a keyword has been detected. Specifically, the decision unit 107 decides whether the user utters a keyword included in the keyword recognition dictionary. If a keyword included in the keyword recognition dictionary is uttered, the decision unit 107 decides that a keyword has been detected. If a keyword has been detected, the process proceeds to step S2504, and if not, the process proceeds to step S2508.

In step S2504, the speech recognition unit 103 temporarily stops the grammar-type recognition, namely, the speech recognition process using the grammar recognition dictionary.

In step S2505, a determination unit 106 determines an input target range based on the detected keyword. Since the keyword list included in the keyword recognition dictionary indicates a range specifying utterance, the determination unit 106 can determine the input target range from the character strings representing the number of sequences, the starting point, and the ending point included in the keywords. Specifically, if the keyword "to flaw collectively" has been detected, since "flaw" represents the ending point according to the keyword recognition dictionary, the input target range is a range from the input position of the current input target item as the starting point to the input position corresponding to the item "flaw" as the ending point.

In step S2506, the control unit 108 highlights the input target range. At this time, input format in the input sequence list corresponding to the specified input target range may also be displayed as a content of a value that can be currently recognized.

In step S2507, in preparation for an utterance from the user, the speech recognition unit 103 starts the keyword detection using the first keyword recognition dictionary corresponding to the current input sequence number and the second keyword recognition dictionary in the same manner as in step S2502, and starts the grammar-type recognition using the grammar template to be used for a value corresponding to the keyword detected in step 2503.

In step S2508, the decision unit 107 decides whether a speech recognition result through the grammar recognition dictionary has been acquired or not. If the speech recognition result has been acquired, the process proceeds to step S2509, and if not, the process returns to step S2503, and the same process is repeated.

In step S2509, the speech recognition unit 103 stops the speech recognition process using the grammar recognition dictionary.

In step S2510, the determination unit 106 sets the speech recognition result of the grammar-type recognition as a value utterance.

Subsequently, in the same manner as in the first and second embodiments, a synthetic speech relating to a confirmation message is reproduced, and if an input content is fixed, the input unit 109 inputs a character string related to the value utterance into the input position of the form data. Thereafter, the entry of the input sequence list that corresponds to the input position where a value has been input is set to be an already-input position, and the input process shown in FIG. 25 is performed on the next input position which is blank. The input process of the information processing apparatus 10 according to the third embodiment is thus terminated.

Figure 26:
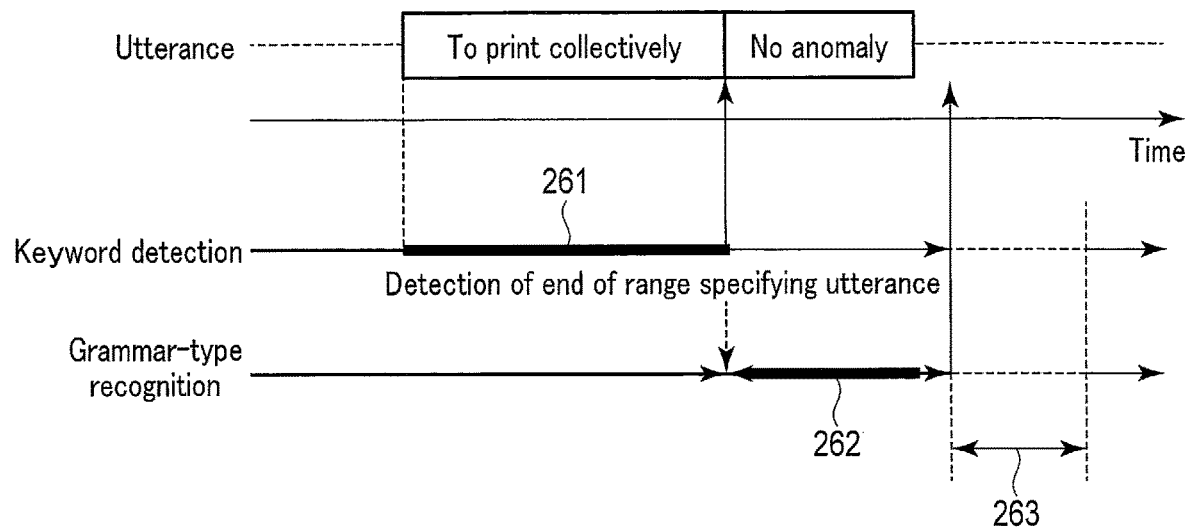
FIG. 26 is a diagram showing a specific example of a speech recognition process according to the third embodiment.
Figure 27:
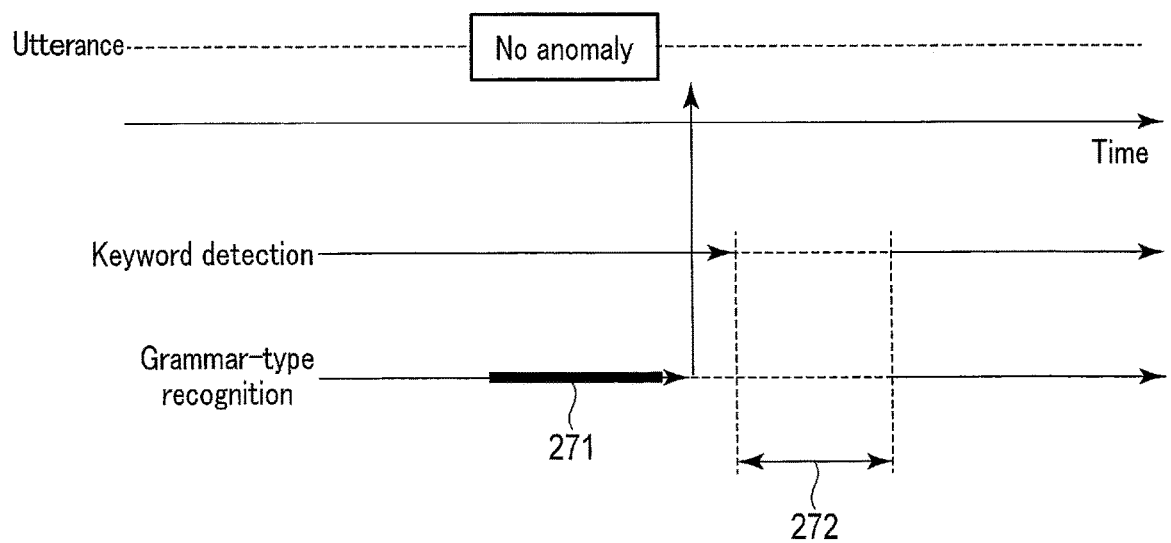
FIG. 27 is a diagram showing a specific example of a speech recognition process according to the third embodiment.

Next, specific examples of the speech recognition process according to the third embodiment will be described with reference to FIGS. 26 and 27. FIG. 26 and FIG. 27 are timing charts of the speech recognition process, showing a timing of each of keyword detection and grammar-type recognition in time sequence.

In the case of FIG. 26, it is assumed that the current input target item is for the sequence of number "2", and that the user has made a range specifying utterance.

Keyword detection is started through the first keyword recognition dictionary using a keyword list relating to, for example, the sequence number "2" shown in FIG. 22, and through the second keyword recognition dictionary using all keyword lists shown in FIG. 23. On the other hand, grammar-type recognition is started through the grammar recognition dictionary using the grammar template corresponding to the sequence numbers "2-4" in FIG. 24. At the same time, audio recording is started.

In the example shown in FIG. 26, it is assumed that the user uttered "to print collectively" in section 261. In this case, the utterance matches "to print collectively" in the keyword list of the first keyword recognition dictionary 220. Therefore, the utterance "to print collectively" is detected as a keyword. As a result of the detection of the keyword, the speech recognition process for each of the keyword detection and the grammar-type recognition is stopped while the recording is continued. In addition to the recording, utterances up to the restart of the speech recognition process relating to the grammar-type recognition may be buffered.

The detected keyword is a keyword indicating the ending point. With reference to the input sequence list, the input position "D5" corresponding to "print" included in the detected keyword is extracted. Therefore, the determination unit can determine the input target range "D3-D5" with the input position "D3" of the input target item as the starting point and the ending position "D5" as the ending point.

The keyword detection is unnecessary to specify a speech detection section. Therefore, even if the utterance is not completed, as soon as the keyword is detected, the input target range corresponding to the utterance can be updated and highlighted on the form data. A character string of an available input format may be displayed in the updated input target range.

Subsequently, in section 262, the speech recognition process relating to keyword detection is restarted. Further, the speech recognition process relating to grammar-type recognition is restarted using the grammar template of the sequence numbers corresponding to the detected keyword in the grammar recognition dictionary 240 shown in FIG. 24 (the grammar template corresponding to the sequence numbers "2-4" in FIG. 24). Here, since the input target range has been determined, the speech recognition process relating to grammar-type recognition is continued until a speech recognition result is generated (the rejected recognition result is ignored.) Here, it is assumed that the utterance "no anomaly" is generated as a speech recognition result. In this case, the utterance "no anomaly" matches the grammar template of the sequence numbers "2-4" which is the input target range in the grammar recognition dictionary 240. Therefore, "no anomaly" is generated as a speech recognition result of the grammar-type recognition. Upon detection of the utterance "no anomaly", the speech recognition process relating to keyword detection and grammar-type recognition is temporarily stopped until decisions and inputs are completed in section 263.

Since the character string "no anomaly" detected by the grammar-type recognition is a value utterance, it is input into the input target range "D3-D5".

In the case of FIG. 27, it is assumed that the current input target item corresponds to the sequence number "2", and that the user has made only a value utterance.

In the speech recognition process relating to the keyword detection in section 271 in FIG. 27, no keyword can be detected and no speech recognition result is generated. On the other hand, in the grammar-type recognition process, the utterance "no anomaly" is detected and a speech recognition result is generated. If the speech recognition result is generated, the speech recognition process of keyword detection type and the grammar-type recognition process are stopped in section 272 until the respective decisions and inputs of the processes are completed. Since the value utterance was made, the input target range is maintained to be the input position "D3" corresponding to the sequence number 2, and the character string "no anomaly" is input into the input target range "D3".

According to the third embodiment described above, the speech recognition process relating to the grammar-type recognition in the second embodiment is used to detect a value utterance, and the speech recognition process relating to the keyword detection that does not need to specify a speech detection section is used to detect a range specifying utterance. As a result, the input target range highlight can be updated to the corresponding input target range at a timing when a range specifying utterance is recognized. Therefore, the user who has made the range specifying utterance can immediately judge whether the uttered input target range is interpreted correctly. If it is not correct, the user can restate the input target range. Furthermore, a content based on an available input format can be displayed at a timing when the input target range is updated. Therefore, the user can easily understand the content to be uttered, obviating a situation in which the user cannot understand what should be uttered. Accordingly, in the same manner as in the first embodiment, the efficiency and convenience in data inputting with speech can be improved.

Fourth Embodiment

In the third embodiment, it is assumed that the range specifying utterance is detected through the speech recognition process relating to the keyword detection. In the fourth embodiment, it is assumed that an end of a range specifying utterance is detected through the speech recognition process relating to keyword detection, and a range specifying utterance and a value utterance are detected through the speech recognition process relating to grammar-type recognition.

A block diagram of an information processing apparatus 10 according to the fourth embodiment will be described with reference to FIG. 28.

The information processing apparatus 10 according to the fourth embodiment includes a buffer unit 281 in addition to the configuration of the information processing apparatus 10 according to the third embodiment.

The buffer unit 281 buffers audio data relating to the user's utterance by tracking back for a least a predetermined period of time so as to retroactively utilize the data.

Figures 29, 30:
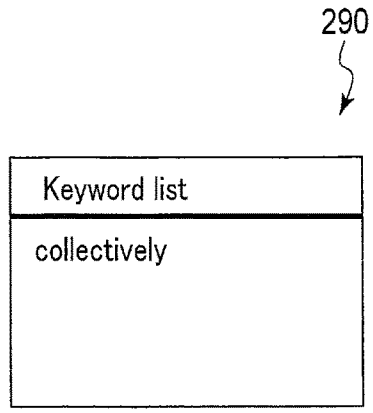
FIG. 29 is a diagram showing an example of a keyword recognition dictionary according to the fourth embodiment.
FIG. 30 is a diagram showing an example of a first grammar recognition dictionary according to the fourth embodiment.

Next, FIG. 29 shows an example of a keyword recognition dictionary used for the keyword detection according to the fourth embodiment.

The keyword recognition dictionary shown in FIG. 29 is configured to detect the end of a range specifying utterance; for example, keywords relating to an end portion, such as "collectively". It suffices that the keyword recognition dictionary is generated by, for example, extracting an end portion of a range specifying template. What part of the end portion should be extracted may be determined in any way, as long as keyword detection can be performed. For example, the word "collectively" may be set as a keyword as long as a detection accuracy is assured in practical operation. If the word "collectively" is too short to assure satisfactory detection accuracy, a longer word may be set as the end portion.

A grammar recognition dictionary for use in the grammar-type recognition according to the fourth embodiment will be described with reference to FIGS. 30 and 31.

The grammar recognition dictionary is formed by using a first grammar recognition dictionary which is a range dictionary to recognize a speech retroactively by tracking back when a keyword is detected and which relates to an input range with the input target item as a starting point, a second grammar recognition dictionary relating to an input range that can be detected anytime, and a value dictionary.

FIG. 30 is an example of the first grammar recognition dictionary 300. The first grammar recognition dictionary 300 is similar to the first keyword recognition dictionary 220 shown in FIG. 22 except that the grammar is expressed instead of a keyword.

FIG. 31 is an example of the second grammar recognition dictionary 310. The second grammar recognition dictionary 310 is similar to the second keyword recognition dictionary 230 shown in FIG. 23 except that the grammar is expressed instead of a keyword. The grammar recognition dictionary shown in FIG. 24 may be used as the value dictionary.

Next, an example of the grammar recognition dictionary according to the fourth embodiment is shown in FIG. 32.

The grammar recognition dictionary 320 shown in FIG. 32 is generated by, for example, extracting a grammar template with the sequence number "2" as a starting point from the first grammar recognition dictionary 300 shown in FIG. 30, and extracting all grammar templates from the second grammar recognition dictionary 310 shown in FIG. 31. The keyword recognition dictionary 290, the first grammar recognition dictionary 300, the second grammar recognition dictionary 310, and the value dictionary are not necessarily combined into the speech recognition dictionary as shown in FIG. 32, but may be used as individually dictionaries.

Next, the input process of the information processing apparatus according to the fourth embodiment will be described with reference to the flowchart of FIG. 33.

In the information processing apparatus 10 according to the fourth embodiment, the buffer unit 281 buffers speech data for a predetermined period of time T. The buffering always maintains at least the speech data for the latest predetermined period of time T, and may discard the speech data of the past period that has passed the predetermined period of time T. The length of the predetermined period of time T may be a preset time length, for example, 30 seconds, may be a length corresponding to "the longest mora numbers×length of 1 mora" of utterance patterns to specify an input target range, such as an utterance of guidance in the input sequence list, or may be a length calculated based on these values.

In step S3301, the speech recognition unit 103 starts keyword detection using the keyword recognition dictionary, and starts grammar-type recognition using the grammar recognition dictionary corresponding to the current input sequence number. Specifically, the grammar recognition dictionary includes the value dictionary.

In step S3302, if the speech recognition unit 103 detects a keyword in step S2503, it tracks back the speech data from the present time to the past for the predetermined period of time T, and performs grammar-type recognition on the buffered speech data in the predetermined period of time, using a range dictionary (the first grammar recognition dictionary and the second grammar recognition dictionary) corresponding to the current sequence in a speech section from the earliest time to the end time of the keyword. Depending on the setting of the predetermined period of time T, there may be a plurality of speech sections in the buffered speech data. In this case, it is assumed that a plurality of speech recognition results is obtained. It suffices that the speech recognition result corresponding to the latest speech section is adopted.

In step S3303, the speech recognition unit 103 starts keyword detection using the keyword recognition dictionary, and starts grammar-type recognition using the value dictionary corresponding to the determined input target range. The subsequent processes are the same as the input process according to the third embodiment.

Figure 34:
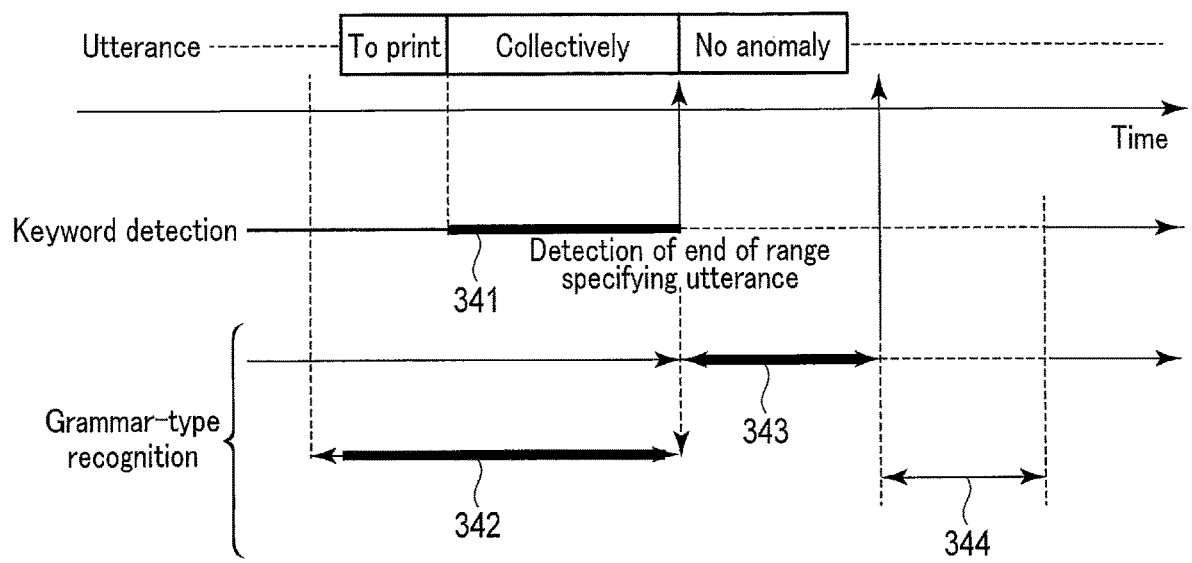
FIG. 34 is a diagram showing a specific example of a speech recognition process according to the fourth embodiment.

Next, a specific example of the speech recognition process according to the fourth embodiment will be described with reference to FIG. 34. FIG. 34 is a timing chart of the speech recognition process, showing a timing of each of keyword detection and grammar-type recognition in time sequence.

In this example, the speech recognition process relating to the keyword detection using the keyword recognition dictionary 290 shown in FIG. 29 and the speech recognition process relating to the grammar-type recognition using the value dictionary similar to that shown in FIG. 24 are performed. In addition, the buffer unit 281 buffers speech data in at least the predetermined period of time T. It is assumed that the user utters "to print collectively" in section 341. With reference to the keyword recognition dictionary 290, since "collectively" exists in the keyword list, the utterance "collectively" is extracted as a keyword. After the utterance "collectively" is detected, the speech recognition process relating to keyword detection and the speech recognition process relating to the grammar-type recognition are stopped.

Regarding the buffered speech data from the time traced back for a predetermined period of time 342 to the utterance "collectively" as the end of the speech section, the speech recognition unit 103 performs the speech recognition process relating to the grammar-type recognition using the range dictionary (the first grammar recognition dictionary 300 and the second grammar recognition dictionary 310). In the case shown in FIG. 34, it is assumed that the speech recognition result "to print collectively" is obtained. Since the speech recognition result "to print collectively" matches the entry of the sequence number "3" in the first grammar recognition dictionary 300 shown in FIG. 30, it can be detected as a range specifying utterance.

Thereafter, in section 343, the speech recognition process relating to the keyword detection using the keyword recognition dictionary 290 and the speech recognition process relating to the grammar-type recognition using the value dictionary corresponding to the range specifying utterance in the predetermined period of time 342 are restarted. Specifically, regarding the range specifying utterance "to print collectively", the grammar used for a value of the corresponding entry in the first grammar recognition dictionary is "2-4". Therefore, the grammar-type recognition is performed using the grammar template "'no anomaly'|'exchange required'|'skip'" of the sequence number "2-4" in the value dictionary shown in FIG. 24. In section 343, the user utters "no anomaly", which matches the grammar template of the sequence number "2-4", thus "no anomaly" can be detected as a value utterance.

If a speech recognition result is not generated through the speech recognition process relating to the grammar-type recognition in the predetermined period of time 342, it is determined that a range specifying utterance has not been made. In this case, it suffices that the speech recognition process relating to the keyword detection and the speech recognition process relating to the grammar-type recognition using the value dictionary are restarted.

In section 343, if a keyword is detected through the speech recognition process relating to the keyword detection, it suffices that the speech data are tracked back for the predetermined period of time from the end of the utterance relating to the keyword, and that grammar-type recognition using the range dictionary is performed on the buffered speech data.

According to the fourth embodiment described above, the grammar-type recognition is performed on the buffered speech data by tracking back for the predetermined period of time from the time point of the speech recognition result of the keyword detection, and the input target range is determined from the range specifying utterance. As a result, the amount of keyword lists included in the keyword recognition dictionary for use in the speech recognition process relating to the keyword detection can be reduced. Therefore, in addition to the same advantages as those of the third embodiment, the fourth embodiment is advantageous in increasing the patterns that can be detected as a range specifying utterance by using the grammar recognition dictionary, which can detect a wider variety of formats as compared to the keyword detection.

Fifth Embodiment

In the embodiments described above, an input target range relating to an input position to input a value to form data is determined. However, in the case of preparing a daily report or the like of form data, a situation of copying a value that was input to the form data generated in the past is assumed. In the fifth embodiment, a copy target range for a value to be input to an input position is determined.

An operation of an information processing apparatus 10 according to the fifth embodiment will be described with reference to FIG. 35.

An upper part of FIG. 35 shows form data which is currently being input on the inspection date of "2021/02/15", and a lower part of FIG. 35 shows form data in which values were input in the past on the inspection date of "2021/02/01".

Using a specified word as a trigger, for example, the information processing apparatus 10 performs a process of determining a copy target range 351 to copy a value from the past form data. For example, if a speech recognition unit 103 generates a speech recognition result "copy mode", the information processing apparatus 10 may transfer to a mode to set the copy target range 351 to the form data which is a copy source.

The copy target range 351 may be determined in the same manner as for the input target range of the embodiments described above. Specifically, if identifiers of the input positions are used, the copy target range can be expressed as "from D3 to D5". If test numbers shown in FIG. 35 are used, the copy target range can be expressed as "from No. 1 to No. 3".

After the copy target range 351 is determined, an input target range 352 "D3-D5" is determined through the input process of the information processing apparatus 10 according to the first to fourth embodiments. If the input target range 352 is determined, an input unit 109 copies the value in the copy target range 351 to the input target range 352. Specifically, in the input target range 352, "no anomaly" is input to D3 and D4 and "slightly light" is input to D5.

The order of setting the copy target range 351 and the input target range 352 is not determined. The copy target range 351 may be determined after the input target range 352 is determined. Furthermore, the data of the copy source to set the copy target range 351 is not limited to the past form data. Data may be copied from another input position of the form data in which data is being currently input. Alternatively, a copy source may be a text file or the like having a different data format.

According to the fifth embodiment described above, the information processing apparatus sets an input target range, determines a copy target range relating to a value relating to the input target range, and copies a value in the copy target range to the input target range. As a result, the efficiency and convenience in data inputting with speech can be improved in the same manner as in the embodiments described above.

Next, an example of the hardware configuration of the information processing apparatus 10 according to the above embodiment is shown in the block diagram of FIG. 36.

The information processing apparatus 10 includes a central processing unit (CPU) 361, a random access memory (RAM) 362, a read only memory (ROM) 363, a storage 364, a display 365, an input device 366, and a communication device 367, all of which are connected by a bus.

The CPU 361 is a processor that executes a calculation process and a control process in accordance with programs. The CPU 361 uses a predetermined area of the RAM 362 as a working area, and executes processes of the respective portions of the information processing apparatus 10 described above in cooperation with programs stored in the ROM 363, the storage 364, etc.

The RAM 362 is a memory such as a dynamic random access memory (SDRAM). The RAM 362 functions as a working area of the CPU 361. The ROM 363 is a memory storing programs and various information in a non-rewritable manner.

The storage 364 is a device that writes and reads data in and from a magnetic recording medium, such as a hard disc drive (HDD), a semiconductor storage medium, such as a flash memory, a magnetically recordable storage medium, such as an HDD, or an optically recordable storage medium. The storage 364 writes and reads data in and from a recording medium in accordance with a control from the CPU 361.

The display 365 is a display device, such as a liquid crystal display (LCD). The display 365 displays various information based on a display signal from the CPU 361.

The input device 366 is an input device, such as a mouse and a keyboard. The input device 366 receives information input by the user as an instruction signal, and outputs the instruction signal to the CPU 361.

The communication device 367 communicates with external equipment via a network in accordance with a control from the CPU 361.

The instructions included in the process sequences described in the aforementioned embodiments can be imple-mented based on a software program. A general-purpose computer system may store the program beforehand and read the program in order to attain the same effects as those of the aforementioned information processing apparatus. The instructions in the embodiments described above are stored, as a program executable by a computer, in a magnetic disc (flexible disc, hard disc, etc.), an optical disc (CD-ROM, CD-R, CD-RW, DVD-ROM, DVD±R, DVD±RW, Blu-ray (registered trademark) disc, etc.), a semiconductor memory, or a similar storage medium. As long as the storage medium is readable by a computer or by a built-in system, any storage format can be used. An operation similar to the control of the information processing apparatus of the embodiments described above can be realized if a computer reads a program from the storage medium, and executes the instructions written in the program on the CPU based on the program. The computer may, of course, acquire or read the program by way of a network. In addition, an operating system (OS) working on a computer, database management software, middleware (MW) of a network, etc. may execute a part of the processes to realize the embodiments based on instructions of a program installed from a storage medium onto a computer and a built-in system.

Furthermore, the storage medium according to the embodiments is not limited to a medium independent from a computer or a built-in system, and may include a storage medium storing or temporarily storing a program downloaded through a LAN or the Internet, etc.

Moreover, the number of storage media is not limited to one. The present embodiments include the case where the process is executed by means of a plurality of storage media, and the storage media can take any configuration.

The computer or built-in system in the present embodiments are used to execute each process in the embodiments, based on a program stored in a storage medium, and the computer or built-in system may be an apparatus consisting of a PC, a microcomputer or the like, or may be a system or the like in which a plurality of apparatuses are connected through a network.

The computer adopted in the embodiments is not limited to a PC; it may be a calculation processing apparatus, a microcomputer, or the like included in an information processing apparatus, or a device and apparatus that can realize the functions of the embodiments by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising a processor configured to:
    generate a template, regarding a recording data sheet including a plurality of items, for one or more of the items that can be specified, with reference to an input order of input target items selected from the items;
    perform a speech recognition on an utterance of a user and generate a speech recognition result including a result of classifying, based on the template, the utterance into a range specifying utterance and a value utterance indicative of a value to be input; and determine an input target range relating to a plurality of items specified by the utterance of the user among the items based on the range specifying utterance.

2. The apparatus according to claim 1, wherein the processor is further configured to decide, when the speech recognition result includes a matching portion that matches the template, that a part of the utterance relating to the matching portion is the range specifying utterance to specify the input target range and that a part of the utterance preceding the matching portion of the speech recognition result is the value utterance indicative of a value to be input to the input target range.

3. The apparatus according to claim 2, wherein when the speech recognition result does not include a matching portion that matches the template, the processor decides that the utterance relating to the speech recognition result is the value utterance.

4. The apparatus according to claim 1, wherein the processor generates a grammar recognition dictionary to perform the speech recognition on an utterance that complies with a specific grammar based on the template; and
generates as the speech recognition result the utterance of the user that matches the grammar recognition dictionary.

5. The apparatus according to claim 1, wherein the processor generates a keyword recognition dictionary to detect a specific keyword, and a grammar recognition dictionary to perform the speech recognition on an utterance that complies with a specific grammar; and
generates as a first speech recognition result a first utterance of the user that matches the keyword recognition dictionary, and as a second speech recognition result a second utterance that matches the grammar recognition dictionary and subsequent to the first utterance,
decides the first speech recognition result as the range specifying utterance to specify the input target range, and the second speech recognition result as the value utterance indicative of a value to be input to the input target range.

6. The apparatus according to claim 1, wherein the processor is further configured to:
buffer the utterance of the user as speech data, generate a keyword recognition dictionary to detect a specific keyword, and a grammar recognition dictionary to perform the speech recognition on an utterance that complies with a specific grammar;
generate as a first speech recognition result a first utterance of the user that matches the keyword recognition dictionary, and as a second speech recognition result a second utterance that matches the grammar recognition dictionary of the speech data tracking back a predetermined period of time from a speech data portion corresponding to the first speech recognition result using the buffered speech data; and
decide the second speech recognition result as the range specifying utterance to specify the input target range.

7. The apparatus according to claim 6, wherein
the processor generates as a third speech recognition result a third utterance that matches the grammar recognition dictionary of speech data subsequent to the speech data portion corresponding to the first speech recognition result; and
decides the third speech recognition result as the value utterance indicative of a value to be input to the input target range.

8. The apparatus according to claim 2, wherein the input target range is a range to specify an input position on the recording data sheet,
the processor is further configured to input a value relating to the value utterance into the input position.

9. The apparatus according to claim 8, wherein the processor decides whether or not the value utterance is an utterance intended to skip an input to the input target range.

10. The apparatus according to claim 9, wherein the processor inputs no value or inputs a predetermined symbol into the input target range, when the value utterance is decided to be an utterance intended to skip the input.

11. The apparatus according to claim 1, wherein the processor is further configured to highlight the input target range on the recording data sheet.

12. The apparatus according to claim 1, wherein the template is an expression that matches an utterance specifying at least one of an ending point of the input target range, a starting point and the ending point of the input target range, the number of items included in the input target range, and a title of an item included in the input target range.

13. The apparatus according to claim 1, wherein:
the input order is associated with at least one of a title of an item, an identifier of an input position in which a value corresponding to the item is input, and a group name of the item; and
the template indicates the input position using at least one of the title, the identifier and the group name associated with the input order.

14. An formation processing method comprising:
generating a template, regarding a recording data sheet including a plurality of items, for one or more of the items that can be specified, with reference to an input order of input target items selected from the items;
performing a speech recognition on an utterance of a user and generate a speech recognition result including a result of classifying, based on the template, the utterance into a range specifying utterance and a value utterance indicative of a value to be input; and
determining an input target range relating to a plurality of items specified by the utterance of the user among the items based on the range specifying utterance.

15. A non-transitory computer readable medium including computer executable instructions, wherein the instructions, when executed by a processor, cause the processor to perform a method comprising:
generating a template, regarding a recording data sheet including a plurality of items, for one or more of the items that can be specified, with reference to an input order of input target items selected from the items;
performing a speech recognition on an utterance of a user and generate a speech recognition result including a result of classifying, based on the template, the utterance into a range specifying utterance and a value utterance indicative of a value to be input; and
determining an input target range relating to a plurality of items specified by the utterance of the user among the items based on the range specifying utterance.

* * * * *